United States Patent
Hooper et al.

(10) Patent No.: US 6,947,425 B1
(45) Date of Patent: Sep. 20, 2005

(54) MULTI-THREADED SEQUENCED TRANSMIT SOFTWARE FOR PACKET FORWARDING DEVICE

(75) Inventors: Donald F. Hooper, Shrewsbury, MA (US); Matthew J. Adiletta, Worcester, MA (US); Michael F. Fallon, North Andover, MA (US)

(73) Assignee: Intel Corporation, Santa Clara, CA (US)

( * ) Notice: Subject to any disclaimer, the term of this patent is extended or adjusted under 35 U.S.C. 154(b) by 1023 days.

(21) Appl. No.: 09/627,028

(22) Filed: Jul. 27, 2000

Related U.S. Application Data

(63) Continuation-in-part of application No. 09/474,650, filed on Dec. 29, 1999, now Pat. No. 6,661,794.

(51) Int. Cl.[7] .......................... H04L 12/28; H04L 12/56
(52) U.S. Cl. ..................................... 370/394; 370/395.4
(58) Field of Search ................................ 709/102, 103, 709/106, 108; 370/389, 394, 412, 413, 428, 429; 710/52, 64

(56) References Cited

U.S. PATENT DOCUMENTS

| | | | | |
|---|---|---|---|---|
| 5,379,428 A | * | 1/1995 | Belo ........................... | 709/103 |
| 5,677,910 A | * | 10/1997 | Delaney ...................... | 370/402 |
| 6,338,078 B1 | * | 1/2002 | Chang et al. ............... | 709/102 |
| 6,421,676 B1 | * | 7/2002 | Krishnamurthy et al. ... | 707/102 |
| 6,477,562 B2 | * | 11/2002 | Nemirovsky et al. ....... | 709/108 |
| 6,484,224 B1 | * | 11/2002 | Robins et al. .............. | 710/305 |

* cited by examiner

*Primary Examiner*—Huy D. Vu
*Assistant Examiner*—Daniel Ryman
(74) *Attorney, Agent, or Firm*—Robert A. Greenberg

(57) ABSTRACT

A method of forwarding data out of a processor includes receiving data by the processor, then using two schedulers to assign processing threads to transmit data out of the processor. Each of the schedulers supports forwarding data out of ports that are mutually exclusive from those of the other scheduler. The processing threads can operate at least partially simultaneously.

22 Claims, 27 Drawing Sheets

MULTI-THREADED SEQUENCED TRANSMIT SOFTWARE FOR PACKET FORWARDING DEVICE

This application is a continuation-in-part of application Ser. No. 09/474,650, filed Dec. 29, 1999, now U.S. Pat. No. 6,661,794.

BACKGROUND OF THE INVENTION

1. Field of the Invention

The described invention relates to the field of network communications. In particular, the invention relates to a method for transmitting packets of data using multiple programmable threads.

2. Description of Related Art

Networking products such as routers require high speed components for packet data movement, i.e., collecting packet data from incoming network device ports and queuing the packet data for transfer to appropriate forwarding device ports. They also require high-speed special controllers for processing the packet data, that is, parsing the data and making forwarding decisions. Because the implementation of these high-speed functions usually involves the development of ASIC or custom devices, such networking products are of limited flexibility. For example, each controller is assigned to service network packets for one or more given ports on a permanent basis.

DETAILED DESCRIPTION

Figure 1:
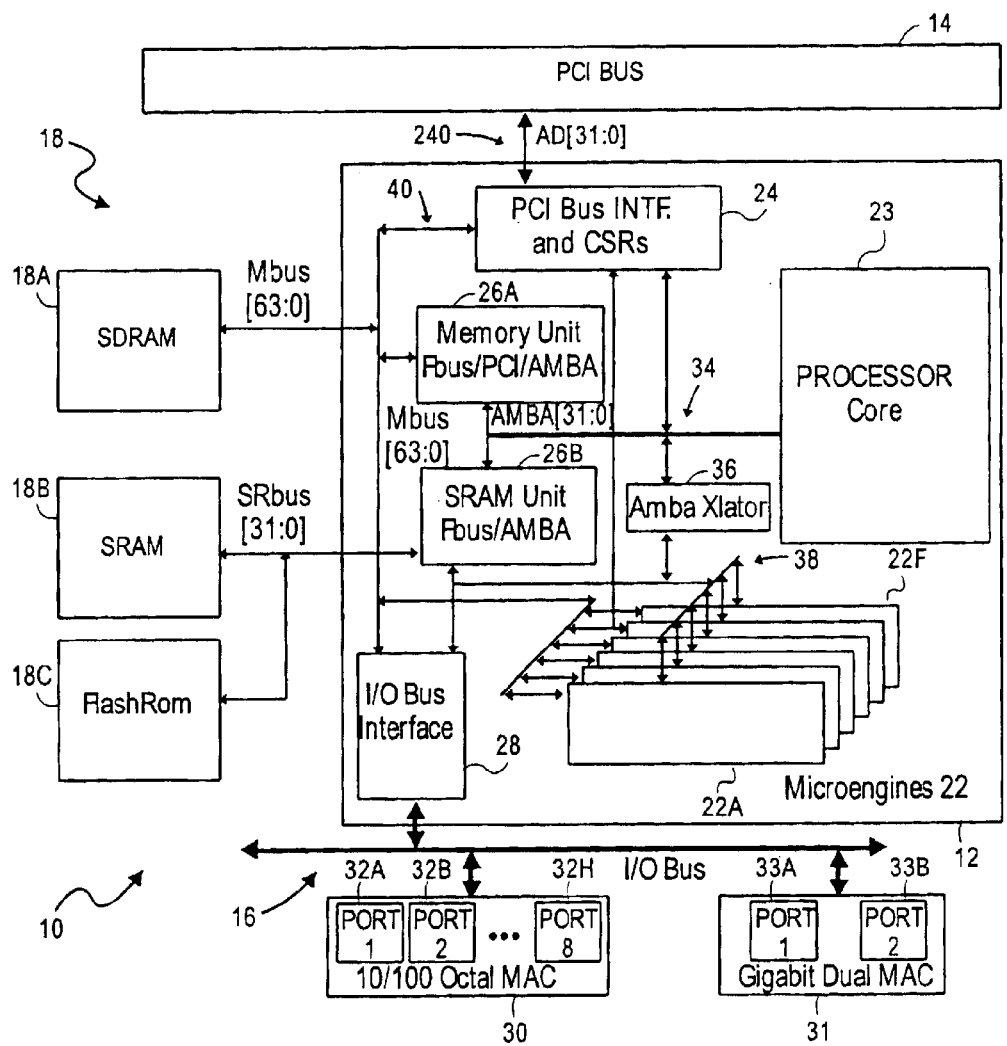
FIG. 1 is a block diagram of a communication system employing a hardware-based multi-threaded processor.

Referring to FIG. 1, a communication system 10 includes a parallel, hardware-based multi-threaded processor 12. The hardware based multi-threaded processor 12 is coupled to a first peripheral bus (shown as a PCI bus) 14, a second peripheral bus referred to as an I/O bus 16 and a memory system 18. The system 10 is especially useful for tasks that can be broken into parallel subtasks or functions. The hardware-based multi-threaded processor 12 includes multiple microengines 22, each with multiple hardware controlled program threads that can be simultaneously active and independently work on a task. In the embodiment shown, there are six microengines 22a–22f and each of the six microengines is capable of processing four program threads, as will be described more fully below.

The hardware-based multi-threaded processor 12 also includes a processor 23 that assists in loading microcode control for other resources of the hardware-based multi-threaded processor 12 and performs other general purpose computer type functions such as handling protocols, exceptions, extra support for packet processing where the microengines pass the packets off for more detailed processing. In one embodiment, the processor 23 is a StrongARM (ARM is a trademark of ARM Limited, United Kingdom) core based architecture. The processor (or core) 23 has an operating system through which the processor 23 can call functions to operate on the microengines 22a–22f. The processor 23 can use any supported operating system, preferably real-time operating system. For the core processor implemented as a StrongARM architecture, operating systems such as MicrosoftNT real-time, VXWorks and :CUS, a freeware operating system available over the Internet, can be used.

The six microengines 22a–22f each operate with shared resources including the memory system 18, a PCI bus interface 24 and an I/O bus interface 28. The PCI bus interface provides an interface to the PCI bus 14. The I/O bus interface 28 is responsible for controlling and interfacing the processor 12 to the I/O bus 16. The memory system 18 includes a Synchronous Dynamic Random Access Memory (SDRAM) 18a, which is accessed via an SDRAM controller 26a, a Static Random Access Memory (SRAM) 18b, which is accessed using an SRAM controller 26b, and a nonvolatile memory (shown as a FlashROM) 18c that is used for boot operations. The SDRAM 16a and SDRAM controller 26a are typically used for processing large volumes of data, e.g., processing of payloads from network packets. The SRAM 18b and SRAM controller 26b are used in a networking implementation for low latency, fast access tasks, e.g., accessing look-up tables, memory for the processor 23, and so forth. The microengines 22a–22f can execute memory reference instructions to either the SDRAM controller 26a or the SRAM controller 18b.

The hardware-based multi-threaded processor 12 interfaces to network devices such as a media access controller device, including a "slow" device 30 (e.g., 10/100 BaseT Ethernet MAC) and/or a high-speed (or fast) device 31, such as Gigabit Ethernet MAC, ATM device or the like, over the I/O bus 16. In the embodiment shown, the slow device 30 is an 10/100 BaseT Octal MAC device and thus includes 8 slow ports 32a–32h, and the high-speed device is a Dual Gigabit MAC device having two fast ports 33a, 33b. Each of the network devices attached to the I/O bus 16 can include a plurality of ports to be serviced by the processor 12. Other devices, such as a host computer (not shown), that may be coupled to the PCI bus 14 are also serviced by the processor 12. In general, as a network processor, the processor 12 can interface to any type of communication device or interface that receives/sends large amounts of data. The processor 12 functioning as a network processor could receive units of packet data from the device 30,31 and process those units of packet data in a parallel manner, as will be described. The unit of packet data could include an entire network packet (e.g., Ethernet packet) or a portion of such a packet.

Each of the functional units of the processor 12 are coupled to one or more internal buses. The internal buses include an internal core bus 34 (labeled "AMBA") for coupling the processor 23 to the memory controllers 26a, 26b and to an AMBA translator 36. The processor 12 also includes a private bus 38 that couples the microengines 22a–22f to the SRAM controller 26b, AMBA translator 36 and the Fbus interface 28. A memory bus 40 couples the memory controllers 26a, 26b to the bus interfaces 24, 28 and the memory system 18.

Figure 2:
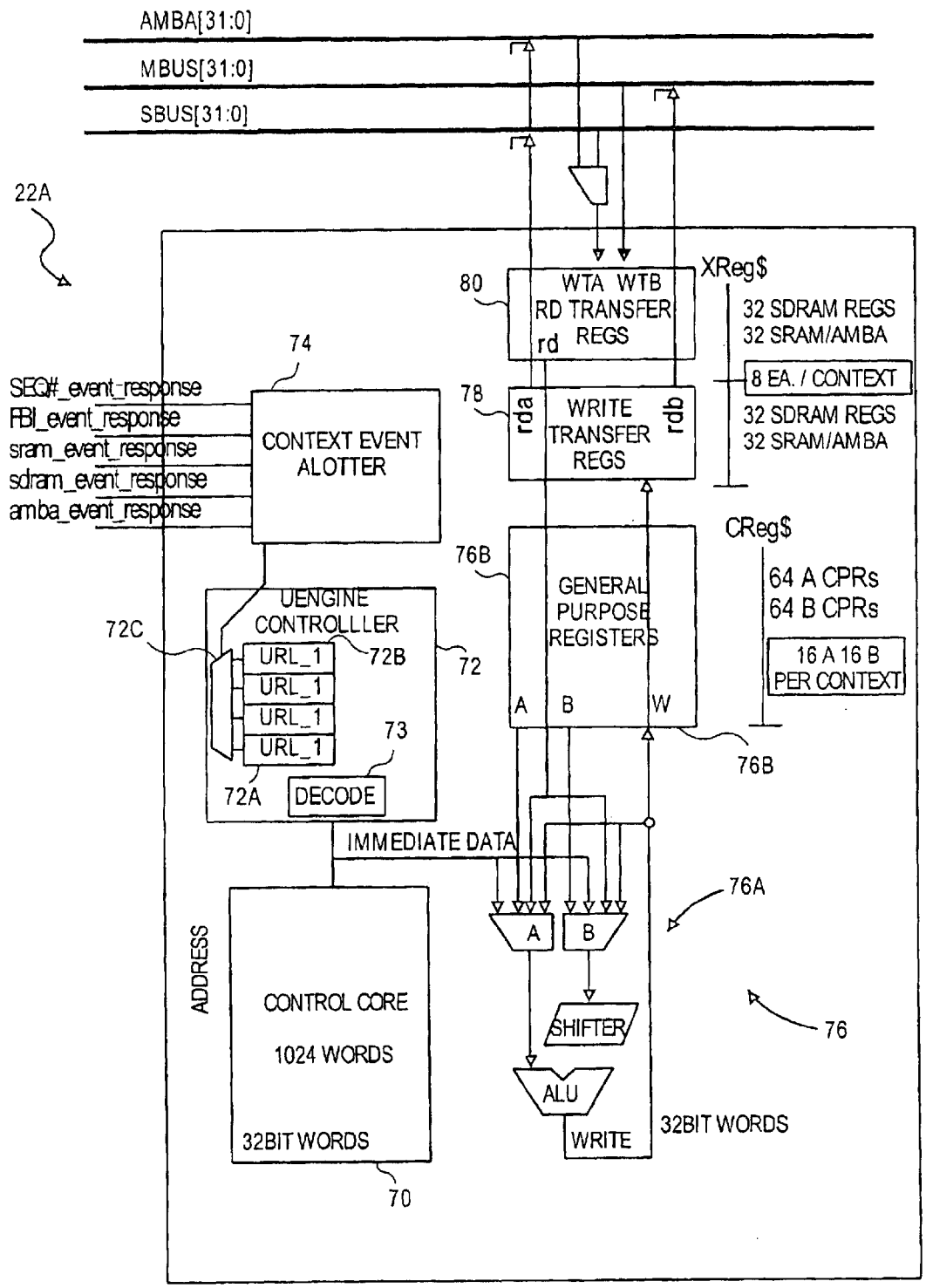
FIG. 2 is a block diagram of a microengine employed in the hardware-based multi-threaded processor of FIG. 1.

Referring to FIG. 2, an exemplary one of the microengines 22a–22f is shown. The microengine 22a includes a control store 70 for storing a microprogram. The microprogram is loadable by the central processor 20. The microengine 70 also includes control logic 72. The control logic 72 includes an instruction decoder 73 and program counter units 72a–72d. The four program counters are maintained in hardware. The microengine 22a also includes context event switching logic 74. The context event switching logic 74 receives messages (e.g., SEQ_#_EVENT_RESPONSE; FBI_EVENT_RESPONSE; SRAM_EVENT_RESPONSE; SDRAM_EVENT_RESPONSE; and AMBA_EVENT_RESPONSE) from each one of the share resources, e.g., SRAM 26b, SDRAM 26a, or processor core 20, control and status registers, and so forth. These messages provides information on whether a requested function has completed. Based on whether or not the function requested by a thread has completed and signaled completion, the thread needs to wait for that complete signal, and if the thread is enabled to operate, then the thread is placed on an available thread list (not shown). As earlier mentioned, the microengine 22a can have a maximum of 4 threads of execution available.

In addition to event signals that are local to an executing thread, the microengine employs signaling states that are global. With signaling states, an executing thread can broadcast a signal state to all microengines 22. Any and all threads in the microengines can branch on these signaling states. These signaling states can be used to determine availability of a resource or whether a resource is due for servicing.

The context event logic 74 has arbitration for the four threads. In one embodiment, the arbitration is a round robin mechanism. However, other arbitration techniques, such as priority queuing or weighted fair queuing, could be used. The microengine 22a also includes an execution box (EBOX) data path 76 that includes an arithmetic logic unit (ALU) 76a and a general purpose register (GPR) set 76b. The ALU 76a performs arithmetic and logical functions as well as shift functions.

The microengine 22a further includes a write transfer registers file 78 and a read transfer registers file 80. The write transfer registers file 78 stores data to be written to a resource. The read transfer registers file 80 is for storing return data from a resource. Subsequent to or concurrent with the data arrival, an event signal from the respective shared resource, e.g., memory controllers 26a, 26b, or core 23, will be provided to the context event arbiter 74, which in turn alerts the thread that the data is available or has been sent. Both transfer register files 78, 80 are connected to the EBOX 76 through a data path. In the described implementation, each of the register files includes 64 registers.

Figure 3:
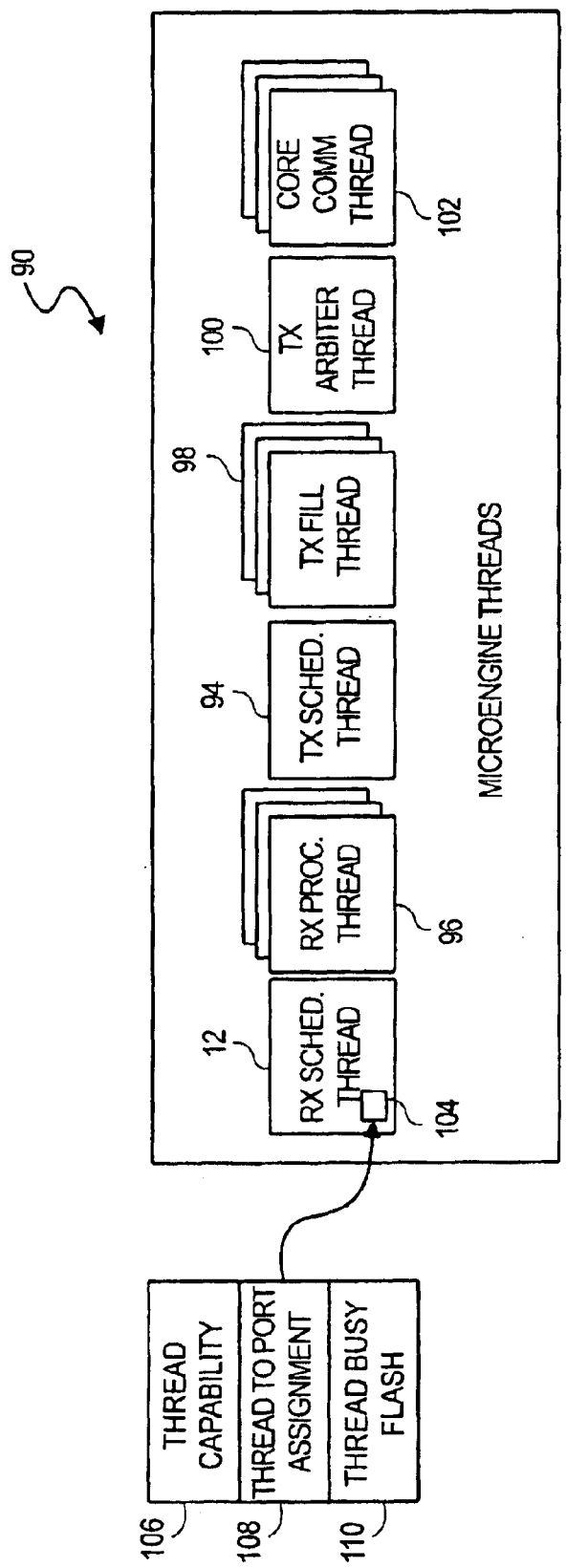
FIG. 3 is an illustration of an exemplary thread task assignment.

The functionality of the microengine threads is determined by microcode loaded (via the core processor) for a particular user's application into each microengine's control store 70. Referring to FIG. 3, an exemplary thread task assignment 90 is shown. Typically, one of the microengine threads is assigned to serve as a receive scheduler 92 and another as a transmit scheduler 94. A plurality of threads are configured as receive processing threads 96 and transmit processing (or fill) threads 98. Other thread task assignments include a transmit arbiter 100 and one or more core communication threads 102. Once launched, a thread performs its function independently.

The receive scheduler thread 92 assigns packets to receive processing threads 96. In a packet forwarding application for a bridge/router, for example, the receive processing thread parses packet headers and performs lookups based in the packet header information. Once the receive processing thread or threads 96 has processed the packet, it either sends the packet as an exception to be further processed by the core 23 (e.g., the forwarding information cannot be located in lookup and the core processor must learn it), or stores the packet in the SDRAM and queues the packet in a transmit queue by placing a packet link descriptor for it in a transmit queue associated with the transmit (forwarding port) indicated by the header/lookup. The transmit queue is stored in the SRAM. The transmit arbiter thread 100 prioritizes the transmit queues and the transmit scheduler thread 94 assigns packets to transmit processing threads that send the packet out onto the forwarding port indicated by the header/lookup information during the receive processing.

The receive processing threads 96 may be dedicated to servicing particular ports or may be assigned to ports dynamically by the receive scheduler thread 92. For certain system configurations, a dedicated assignment may be desirable. For example, if the number of ports is equal to the number of receive processing threads 96, then it may be quite practical as well as efficient to assign the receive processing threads to ports in a one-to-one, dedicated assignment. In other system configurations, a dynamic assignment may provide a more efficient use of system resources.

The receive scheduler thread 92 maintains scheduling information 104 in the GPRs 76b of the microengine within which it executes. The scheduling information 104 includes thread capabilities information 106, thread-to-port assignments (list) 108 and "thread busy" tracking information 110. At minimum, the thread capabilities information informs the receive scheduler thread as to the type of tasks for which the other threads are configured, e.g., which threads serve as receive processing threads. Additionally, it may inform the receive scheduler of other capabilities that may be appropriate to the servicing of a particular port. For instance, a receive processing thread may be configured to support a certain protocol, or a particular port or ports. A current list of the ports to which active receive processing threads have been assigned by the receive scheduler thread is maintained in the thread-to-port assignments list 108. The thread busy mask register 110 indicates which threads are actively servicing a port. The receive scheduler uses all of this scheduling information in selecting threads to be assigned to ports that require service for available packet data, as will be described in further detail below.

Figure 4:
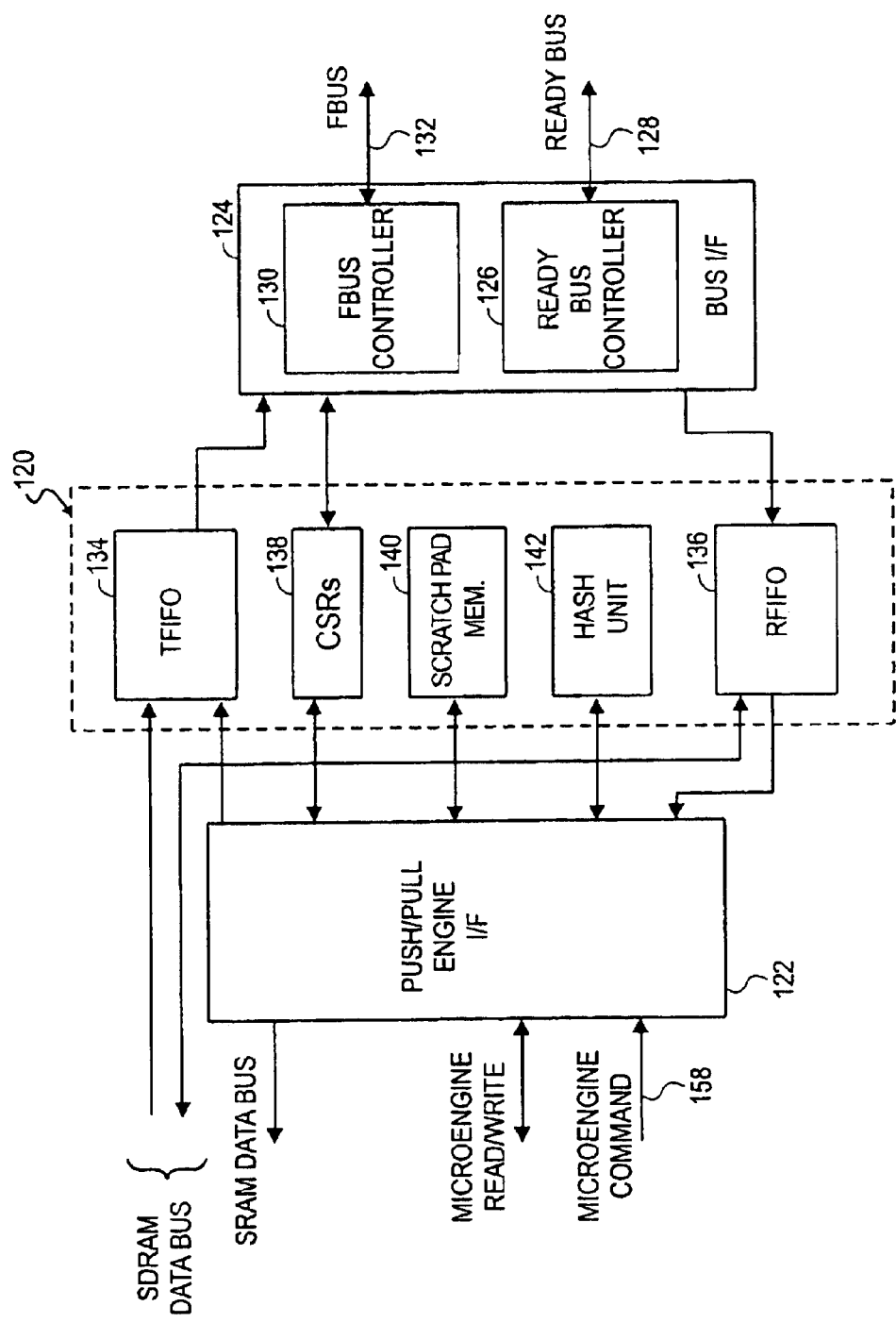
FIG. 4 is a block diagram of an I/O bus interface shown in FIG. 1.

Referring to FIG. 4, the I/O bus interface 28 includes shared resources 120, which are coupled to a push/pull engine interface 122 and a bus interface unit 124. The bus interface unit 124 includes a ready bus controller 126 connected to a ready bus 128 and an Fbus controller 130 for connecting to a portion of the I/O bus referred to as an Fbus 132. Collectively, the ready bus 128 and the Fbus 132 make up the signals of the I/O bus 16 (FIG. 1). The resources 120 include two FIFOs, a transmit FIFO 134 and a receive FIFO 136, as well as control status registers ("CSRs") 138, a scratchpad memory 140 and a hash unit 142. The Fbus 132 transfers data between the ports of the device 30,31 and the I/O bus interface 28. The ready bus 128 is an 8-bit bus that performs several functions. It is used to read control information about data availability from the device 30,31, e.g., in the form of ready status flags. It also provides flow control information to the device 30,31 and may be used to communicate with another network processor 12 that is connected to the Fbus 132. Both buses 128, 132 are accessed by the microengines 22 through the CSRs 138. The CSRs 138 are used for bus configuration, for accessing the bus interface unit 124, and for inter-thread signaling. They also include a several counters and thread status registers, as will be described. The CSRs 138 are accessed by the microengines 22 and the core 23. The receive FIFO (RFIFO) 136 includes data buffers for holding data received from the Fbus 132 and is read by the microengines 22. The transmit FIFO (TFIFO) 134 includes data buffers that hold data to be transmitted to the Fbus 132 and is written by the microengines 22. The scratchpad memory 140 is accessed by the core 23 and microengines 22, and supports a variety of operations, including read and write operations, as well as bit test, bit test/clear and increment operations. The hash unit 142 generates hash indexes for 48-bit or 64-bit data and is accessed by the microengines 22 during lookup operations.

The processors 23 and 22 issue commands to the push/pull engine interface 122 when accessing one of the resources 120. The push/pull engine interface 122 places the commands into queues (not shown), arbitrates which commands to service, and moves data between the resources 120, the core 23 and the microengines 22. In addition to servicing requests from the core 23 and microengines 22, the push/pull engines 122 also service requests from the ready bus 128 to transfer control information to a register in the microengine read transfer registers 80.

When a thread issues a request to a resource 120, a command is driven onto an internal command bus 158 and placed in queues within the push/pull engine interface 122.

Receive/read-related instructions (such as instructions for reading the CSRS) are written to a "push" command queue.

The CSRs 138 include the following types of registers: Fbus receive and transmit registers; Fbus and ready bus configuration registers; ready bus control registers; hash unit configuration registers; interrupt registers; and several miscellaneous registers, including a thread status registers. Those of the registers which pertain to the receive process will be described in further detail.

The interrupt/signal registers include an INTER_THD_SIG register for inter-thread signaling. Any thread within the microengines 22 or the core 23 can write a thread number to this register to signal an inter-thread event.

Figure 5:
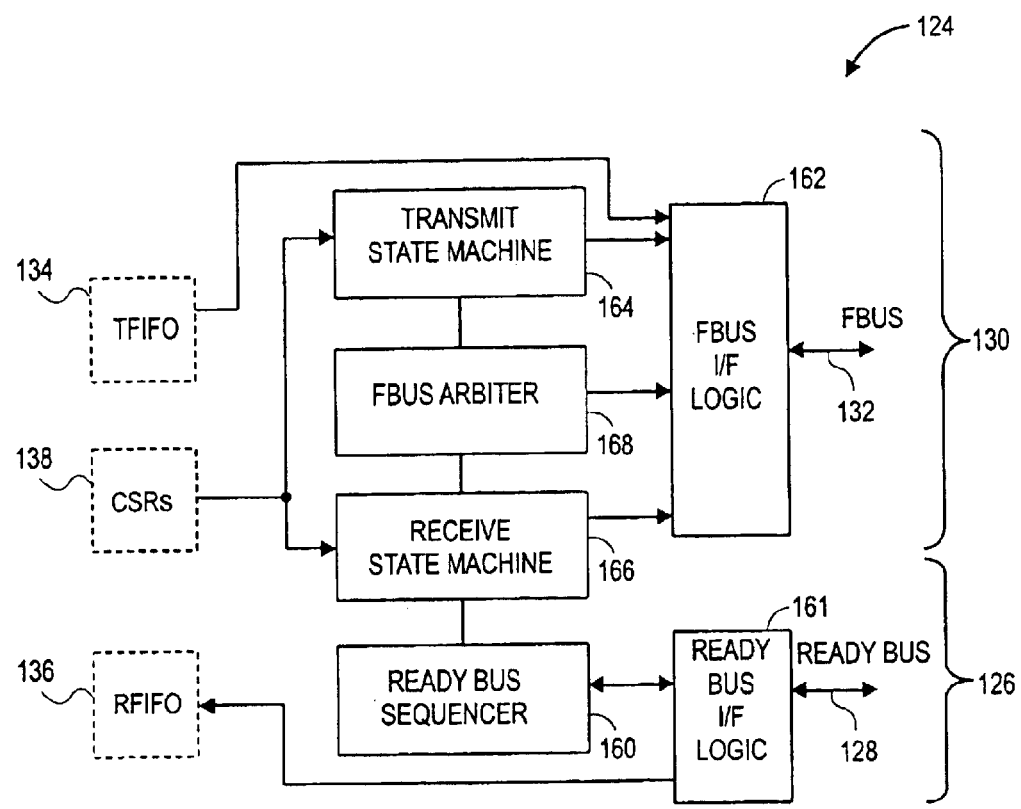
FIG. 5 is a detailed diagram of a bus interface unit employed by the I/O bus interface of FIG. 4.

Further details of the Fbus controller 130 and the ready bus controller 126 are shown in FIG. 5. The ready bus controller 126 includes a programmable sequencer 160 for retrieving MAC device status information from the MAC device 30, 31 and asserting flow control to the MAC device over the ready bus 128 via ready bus interface logic 161. The Fbus controller 130 includes Fbus interface logic 162, which is used to transfer data to and from the device 30, 31 is controlled by a transmit state machine (TSM) 164 and a receive state machine (RSM) 166. In the embodiment herein, the Fbus 132 may be configured as a bidirectional 64-bit bus, or two dedicated 32-bit buses. In the unidirectional, 32-bit configuration, each of the state machines owns its own 32-bit bus. In the bidirectional configuration, the ownership of the bus is established through arbitration. Accordingly, the Fbus controller 130 further includes a bus arbiter 168 for selecting which state machine owns the Fbus 132.

Figure 6A:
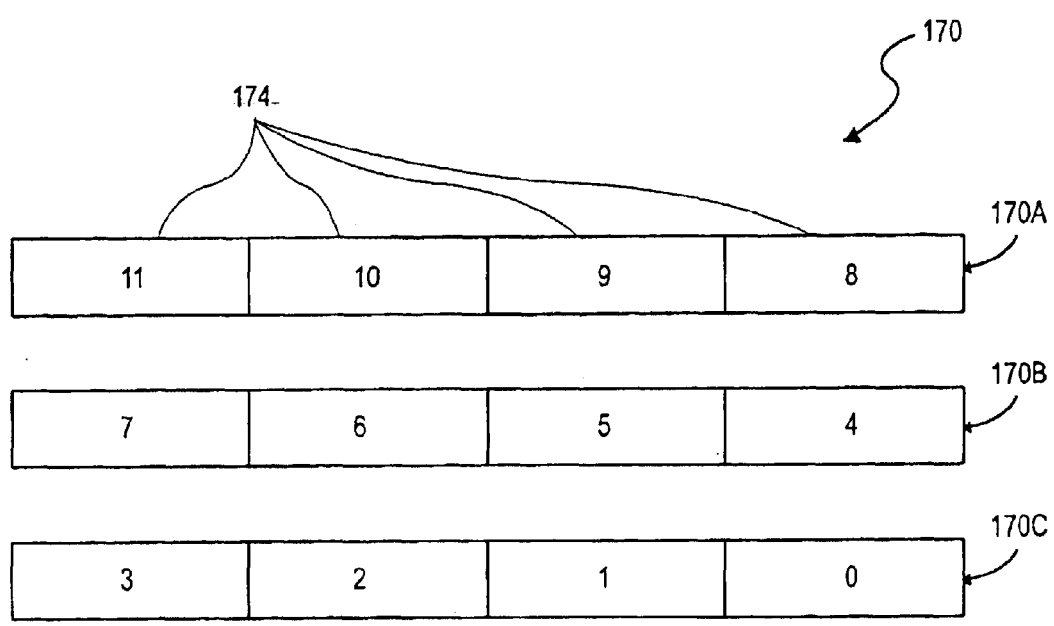
FIGS. 6A–6F are illustrations of various bus configuration control and status registers (CSRs).
Figure 6B:
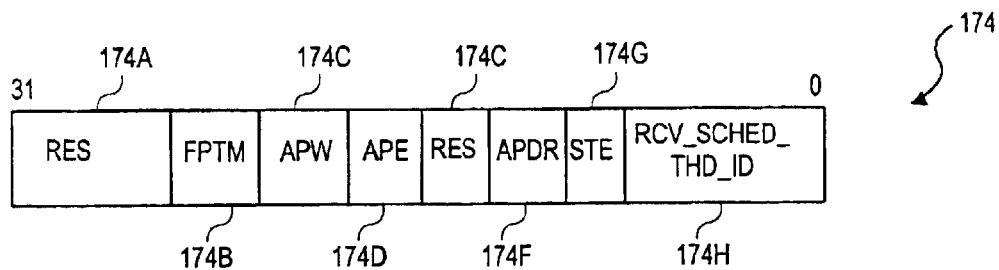

Some of the relevant CSRs used to program and control the ready bus 128 and Fbus 132 for receive processes are shown in FIGS. 6A–6F. Referring to FIG. 6A, RDYBUS_TEMPLATE_PROGx registers 170 are used to store instructions for the ready bus sequencer. Each register of these 32-bit registers 170a, 170b, 170c, includes four, 8-bit instruction fields 172. Referring to FIG. 6B, a RCV_RDY_CTL register 174 specifies the behavior of the receive state machine 166. The format is as follows: a reserved field (bits 31:15) 174a; a fast port mode field (bits 14:13) 174b, which specifies the fast port thread mode, as will be described; an auto push prevent window field (bits 12:10) 174c for specifying the autopush prevent window used by the ready bus sequencer to prevent the receive scheduler from accessing its read transfer registers when an autopush operation (which pushes information to those registers) is about to begin; an autopush enable (bit 9) 174d, used to enable autopush of the receive ready flags; another reserved field (bit 8) 174e; an autopush destination field (bits 7:6) 174f for specifying an autopush operation's destination register; a signal thread enable field (bit 5) 174g which, when set, indicates the thread to be signaled after an autopush operation; and a receive scheduler thread ID (bits 4:0) 174h, which specifies the ID of the microengine thread that has been configured as a receive scheduler.

Figure 6C:
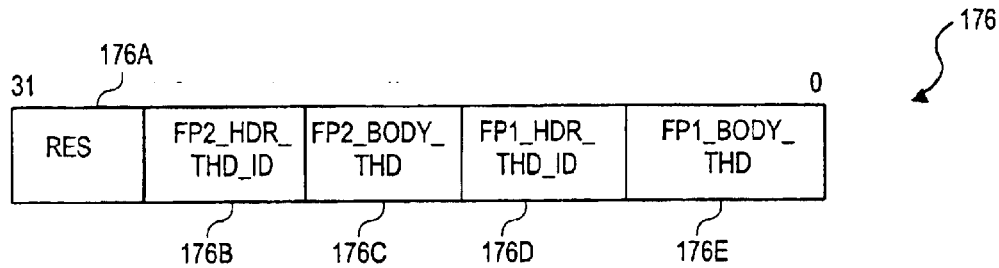
Figure 6D:
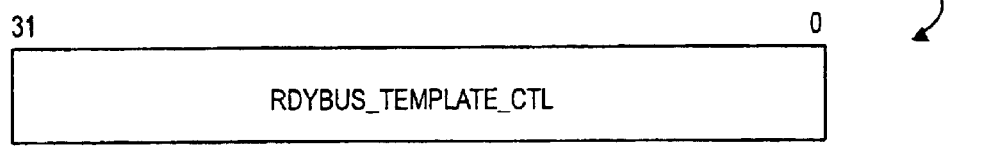
Figure 6E:
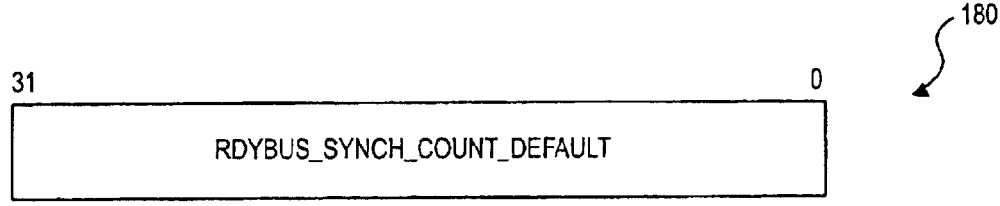
Figure 6F:

Referring to FIG. 6C, a REC_FASTPORT_CTL register 176 is relevant to receiving packet data from fast ports such as ports 33a and 33b. It enables receive threads to view the current assignment of header and body thread assignments for these two fast ports, as will be described. It includes the following fields: a reserved field (bits 31:20) 176a; an FP2_HDR_THD_ID field (bits 19:15) 176b, which specifies the fast port 2 header receive (processing) thread ID; an FP2_BODY_THD_ID field (bits 14:10) 176c for specifying the fast port 2 body receive processing thread ID; an FP1_HDR_THD_ID field (bits 9:5) 176d for specifying the fast port 1 header receive processing thread ID; and an FP1_BODY_THD_ID field (bits 4:0) 176e for specifying the fast port 1 body processing thread ID. The manner in which these fields are used by the RSM 166 will be described in detail later.

Although not depicted in detail, other bus registers include the following: a RDYBUS_TEMPLATE_CTL register 178 (FIG. 6D), which maintains the control information for the ready bus and the Fbus controllers, for example, it enables the ready bus sequencer; a RDYBUS_SYNCH_COUNT_DEFAULT register 180 (FIG. 6E), which specifies the program cycle rate of the ready bus sequencer; and an FP_FASTPORT_CTL register 182 (FIG. 6F), which specifies how many Fbus clock cycles the RSM 166 must wait between the last data transfer and the next sampling of fast receive status, as will be described.

Figure 7A:
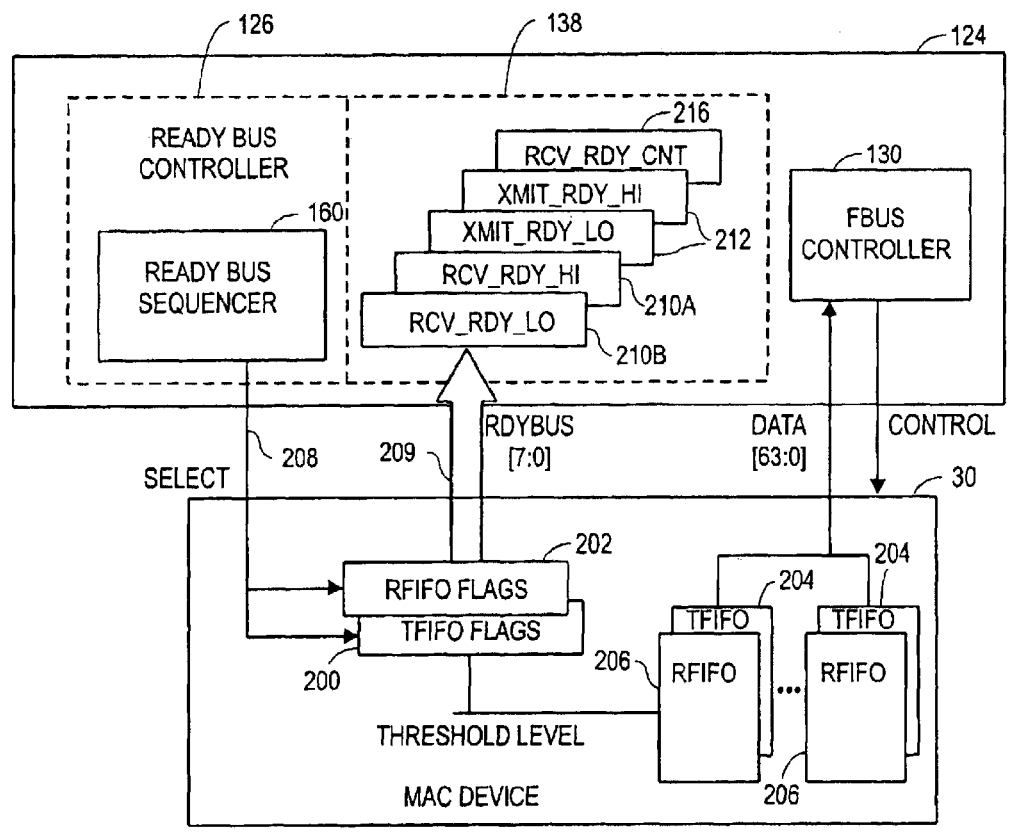
FIG. 7A is a detailed diagram illustrating the interconnection between a plurality of 10/100 Ethernet ("slow") ports and the bus interface unit.

Referring to FIG. 7A, the MAC device 30 provides transmit status flags 200 and receive status flags 202 that indicate whether the amount of data in an associated transmit FIFO 204 or receive FIFO 206 has reached a certain threshold level. The ready bus sequencer 160 periodically polls the ready flags (after selecting either the receive ready flags 202 or the transmit ready flags 200 via a flag select 208) and places them into appropriate ones of the CSRs 138 by transferring the flag data over ready bus data lines 209. In this embodiment, the ready bus includes 8 data lines for transferring flag data from each port to the Fbus interface unit 124. The CSRs in which the flag data are written are defined as RCV_RDY_HI/LO registers 210 for receive ready flags and XMIT_RDY_HI/LO registers 212 for transmit ready flags, if the ready bus sequencer 160 is programmed to execute receive and transmit ready flag read instructions, respectively.

When the ready bus sequencer is programmed with an appropriate instruction directing it to interrogate MAC receive ready flags, it reads the receive ready flags from the MAC device or devices specified in the instruction and places the flags into RCV_RDY_HI register 210a and a RCV_RDY_LO register 210b, collectively, RCV_RDY registers 210. Each bit in these registers corresponds to a different device port on the I/O bus.

Figure 7B:
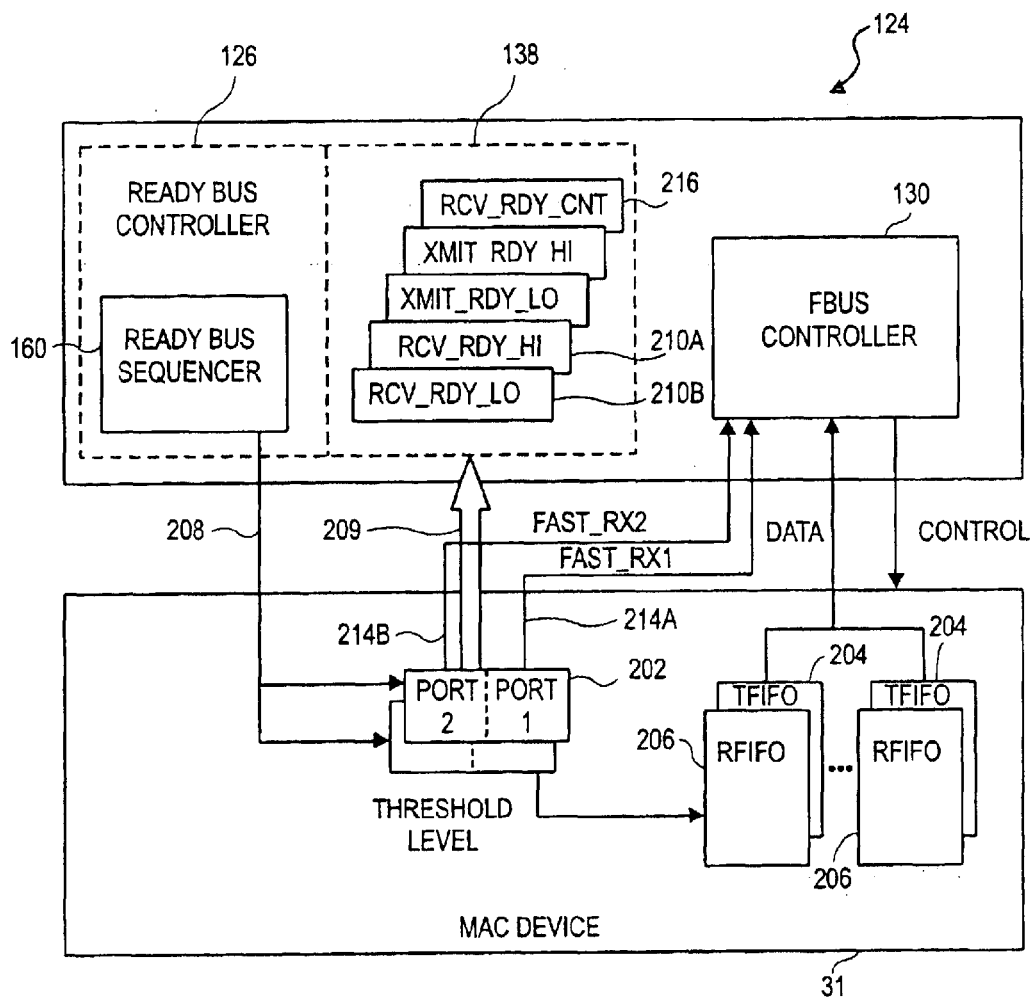
FIG. 7B is a detailed diagram illustrating the interconnection between two Gigabit Ethernet ("fast") ports and the bus interface unit.

Also, and as shown in FIG. 7B, the bus interface unit 124 also supports two fast port receive ready flag pins FAST_RX1 214a and FAST_RX2 214b for the two fast ports of the fast MAC device 31. These fast port receive ready flag pins are read by the RSM 166 directly and placed into an RCV_RDY_CNT register 216.

The RCV_RDY_CNT register 216 is one of several used by the receive scheduler to determine how to issue a receive request. It also indicates whether a flow control request is issued.

Figure 8A:
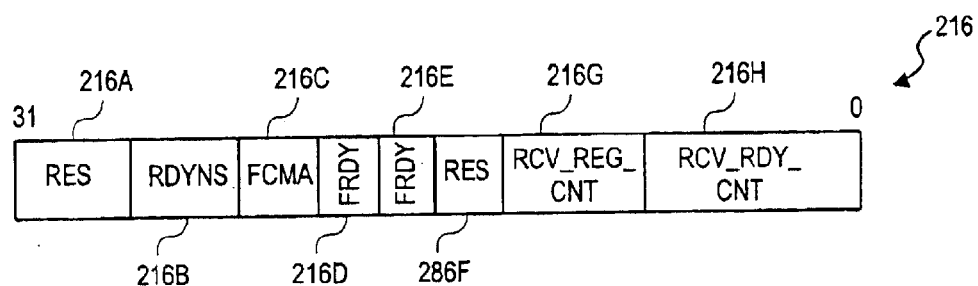
FIGS. 8A–8C are illustrations of the formats of the RCV_RDY_CTL, RCV_RDY_HI and RCV_RDY_LO CSR registers, respectively.

Referring to FIG. 8A, the format of the RCV_RDY_CNT register 216 is as follows: bits 31:28 are defined as a reserved field 216a; bit 27 is defined as a ready bus master field 216b and is used to indicate whether the ready bus 128 is configured as a master or slave; a field corresponding to bit 26 216c provides flow control information; bits 25 and 24 correspond to FRDY2 field 216d and FRDY1 field 216e, respectively. The FRDY2 216d and FRDY1 216e are used to store the values of the FAST_RX2 pin 214b and FAST_RX1 pin 214a, respectively, both of which are sampled by the RSM 166 each Fbus clock cycle; bits 23:16 correspond to a reserved field 216f; a receive request count field (bits 15:8) 216g specifies a receive request count, which is incremented after the RSM 166 completes a receive request and data is available in the RFIFO 136; a receive ready count field (bits 7:0) 216h specifies a receive ready count, an 8-bit counter that is incremented each time the ready bus sequencer 160 writes the ready bus registers RCV_RDY_CNT register 216, the RCV_RDY_LO register 210b and RCV_RDY_HI register 210a to the receive scheduler read transfer registers.

There are two techniques for reading the ready bus registers: "autopush" and polling. The autopush instruction may be executed by the ready bus sequencer 160 during a receive process (rxautopush) or a transmit process (txautopush). Polling requires that a microengine thread periodically issue read references to the I/O bus interface 28.

The rxautopush operation performs several functions. It increments the receive ready count in the RCV_RDY_CNT register 216. If enabled by the RCV_RDY_CTL register 174, it automatically writes the RCV_RDY_CNT 216, the RCV_RDY_LO and RCV_RDY_HI registers 210b, 210a to the receive scheduler read transfer registers 80 (FIG. 2) and signals to the receive scheduler thread 92 (via a context event signal) when the rxautopush operation is complete.

The ready bus sequencer 160 polls the MAC FIFO receive ready flags periodically and asynchronously to other events occurring in the processor 12. Ideally, the rate at which the MAC FIFO receive ready flags are polled is greater than the maximum rate at which the data is arriving at the MAC device ports. Thus, it is necessary for the receive scheduler thread 92 to determine whether the MAC FIFO receive ready flags read by the ready bus sequencer 160 are new, or whether they have been read already. The rxautopush instruction increments the receive ready count in the RCV_RDY_CNT register 216 each time the instruction executes. The RCV_RDY_CNT register 216 can be used by the receive scheduler thread 92 to determine whether the state of specific flags have to be evaluated or whether they can be ignored because receive requests have been issued and the port is currently being serviced. For example, if the FIFO threshold for a Gigabit Ethernet port is set so that the receive ready flags are asserted when 64 bytes of data are in the MAC receive FIFO 206, then the state of the flags does not change until the next 64 bytes arrive 5120 ns later. If the sequencer 160 is programmed to collect the flags four times each 5120 ns period, the next three sets of ready flags that are collected by the ready bus sequencer 160 can be ignored.

When the receive ready count is used to monitor the freshness of the receive ready flags, there is a possibility that the receive ready flags will be ignored when they are providing new status. For a more accurate determination of ready flag freshness, the receive request count may be used. Each time a receive request is completed and the receive control information is pushed onto the RCV_CNTL register 232, the RSM 166 increments the receive request count. The count is recorded in the RCV_RDY_CNT register the first time the ready bus sequencer executes an rxrdy instruction for each program loop. The receive scheduler thread 92 can use this count to track how many requests the receive state machine has completed. As the receive scheduler thread issues commands, it can maintain a list of the receive requests it submits and the ports associated with each such request.

Figure 8B:
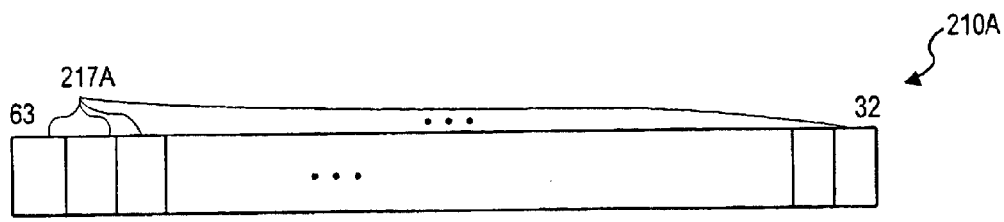
Figure 8C:
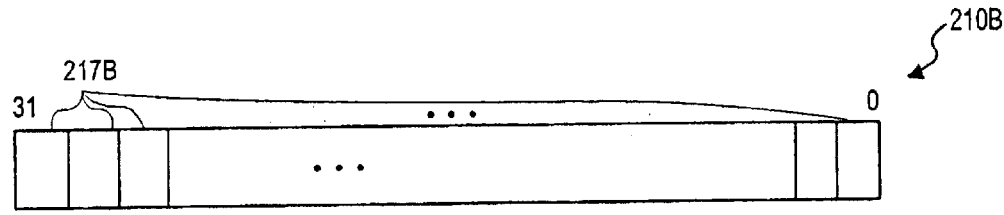

Referring to FIGS. 8B and 8C, the registers RCV_RDY_HI 210a and RCV_RDY_LO 210b have a flag bit 217a, 217b, respectively, corresponding to each port.

Figure 9:
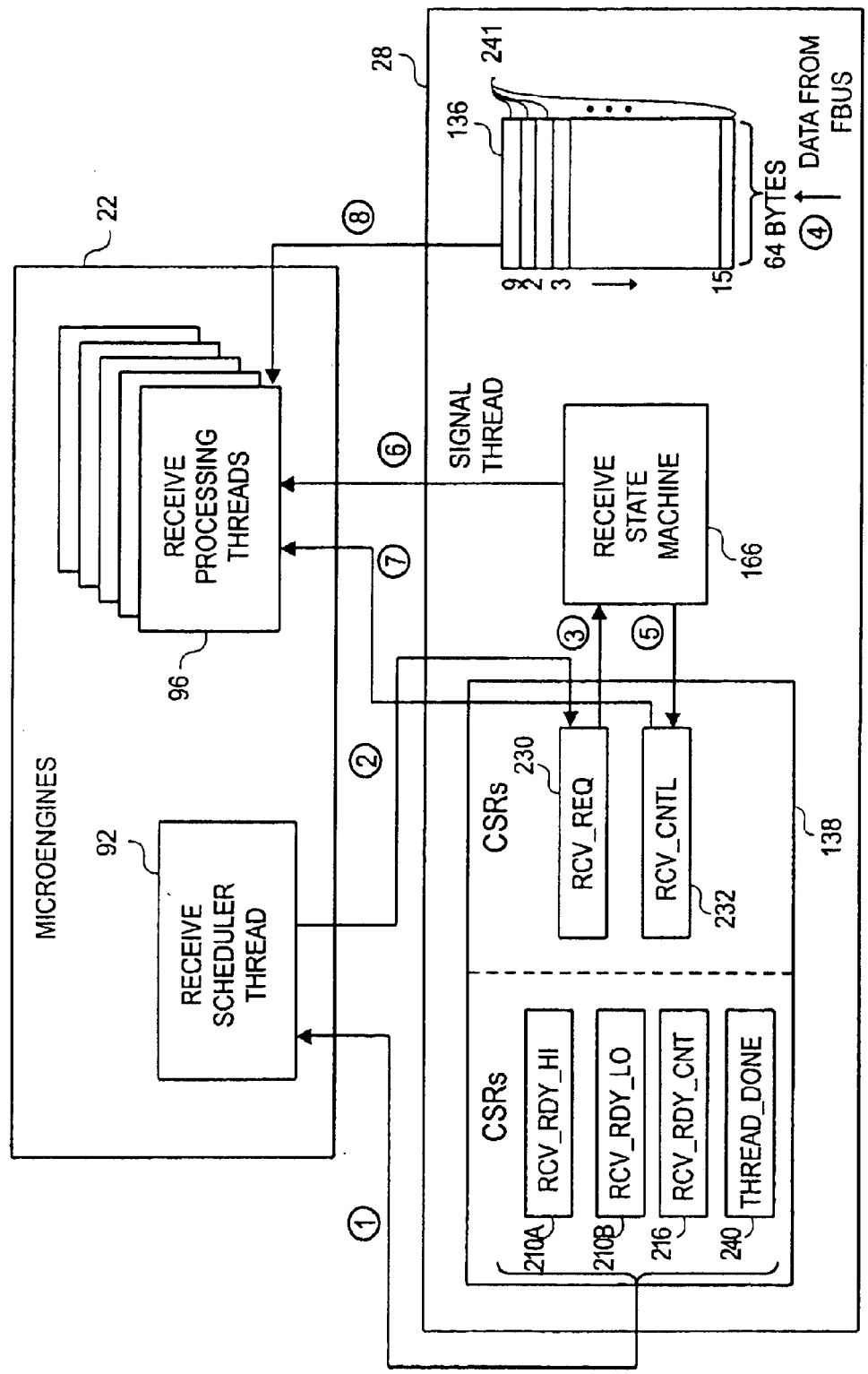
FIG. 9 is a depiction of the receive threads and their interaction with the I/O bus interface during a receive process.

Referring to FIG. 9, the receive scheduler thread 92 performs its tasks at a rate that ensures that the RSM 166 is always busy, that is, that there is always a receive request waiting to be processed by the RSM 166. Several tasks performed by the receive scheduler 92 are as follows. The receive scheduler 92 determines which ports need to be serviced by reading the RCV_RDY_HI, RCV_RDY_LO and RCV_RDY_CNT registers 210a, 210b and 216, respectively. The receive scheduler 92 also determines which receive ready flags are new and which are old using either the receive request count or the receive ready count in the RCV_RDY_CNT register, as described above. It tracks the thread processing status of the other microengine threads by reading thread done status CSRs 240. The receive scheduler thread 92 initiates transfers across the Fbus 132 via the ready bus, while the receive state machine 166 performs the actual read transfer on the Fbus 132. The receive scheduler 92 interfaces to the receive state machine 166 through two FBI CSRs 138: an RCV_REQ register 230 and an RCV_CNTL register 232. The RCV_REQ register 230 instructs the receive state machine on how to receive data from the Fbus 132.

Still referring to FIG. 9, a process of initiating an Fbus receive transfer is shown. Having received ready status information from the RCV_RDY_HI/LO registers 210a, 210b as well as thread availability from the thread done register 240 (transaction 1, as indicated by the arrow labeled "1"), the receive scheduler thread 92 determines if there is room in the RCV_REQ FIFO 230 for another receive request. If it determines that RCV_REQ FIFO 230 has room to receive a request, the receive scheduler thread 92 writes a receive request by pushing data into the RCV_REQ FIFO 230 (transaction 2). The RSM 166 processes the request in the RCV_REQ FIFO 230 (transaction 3). The RSM 166 responds to the request by moving the requested data into the RFIFO 136 (transaction 4), writing associated control information to the RCV_CTL FIFO 232 (transaction 5) and generating a start receive signal event to the receive processing thread 96 specified in the receive request (transaction 6). The RFIFO 136 includes 16 elements 241, each element for storing a 64 byte unit or segment of data referred to herein as a MAC packet ("MPKT"). The RSM 166 reads packets from the MAC ports in fragments equal in size to one or two RFIFO elements, that is, MPKTs. The specified receive processing thread 96 responds to the signal event by reading the control information from the RCV_CTL register 232 (transaction 7). It uses the control information to determine, among other pieces of information, where the data is located in the RFIFO 136. The receive processing thread 96 reads the data from the RFIFO 136 on quadword boundaries into its read transfer registers or moves the data directly into the SDRAM (transaction 8).

The RCV_REQ register 230 is used to initiate a receive transfer on the Fbus and is mapped to a two-entry FIFO that is written by the microengines. The I/O bus interface 28 provides signals (not shown) to the receive scheduler thread indicating that the RCV_REQ FIFO 236 has room available for another receive request and that the last issued request has been stored in the RCV_REQ register 230.

Figure 10A:
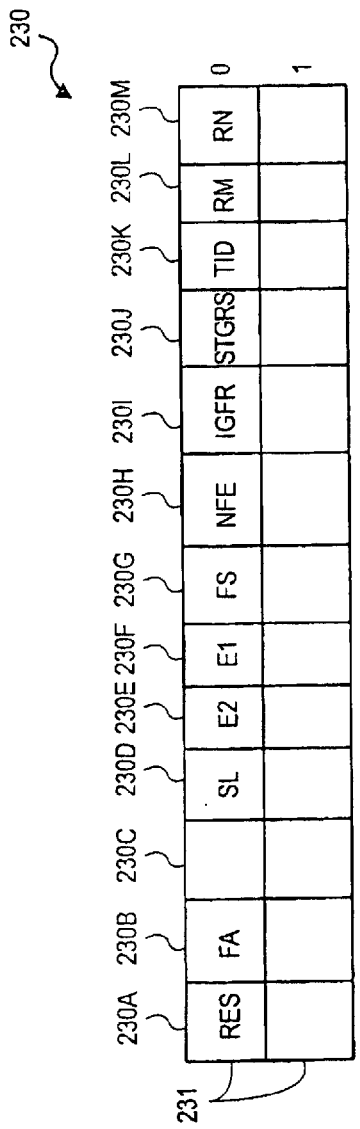
FIGS. 10A and 10B are illustrations of the format of the RCV_REQ FIFO and the RCV_CTL FIFO, respectively.

Referring to FIG. 10A, the RCV_REQ FIFO 230 includes two entries 231. The format of each entry 231 is as follows. The first two bits correspond to a reserved field 230a. Bit 29 is an FA field 230b for specifying the maximum number of Fbus accesses to be performed for this request. A THSG field (bits 28:27) 230c is a two-bit thread message field that allows the scheduler thread to pass a message to the assigned receive thread through the ready state machine, which copies this message to the RCV_CNTL register. An SL field 230d (bit 26) is used in cases where status information is transferred following the EOP MPKT. It indicates whether two or one 32-bit bus accesses are required in a 32-bit Fbus configuration. An E1 field 230e (bits 21:18) and an E2 field (bits 25:22) 230f specify the RFIFO element to receive the transferred data. If only 1 MPKT is received, it is placed in the element indicated by the E1 field. If two MPKTs are received, then the second MPKT is placed in the RFIFO element indicated by the E2 field. An FS field (bits 17:16) 230g specifies use of a fast or slow port mode, that is, whether the request is directed to a fast or slow port. The fast port mode setting signifies to the RSM that a sequence number is to be associated with the request and that it will be handling speculative requests, which will be discussed in further detail later. An NFE field (bit 15) 230h specifies the number of RFIFO elements to be filled (i.e., one or two elements). The IGFR field (bit 13).230i is used only if fast port mode is selected and indicates to the RSM that it should process the request regardless of the status of the fast ready flag pins. An SIGRS field (bit 11) 230j, if set, indicates that the receive scheduler be signaled upon completion of the receive request. A TID field (bits 10:6) 230k specifies the receive thread to be notified or signaled after the receive request is processed. Therefore, if bit 11 is set, the RCV_REQ entry must be read twice, once by the receive thread and once by the receive scheduler thread, before it can be removed from the RCV_REQ FIFO. An RM field (bits 5:3) 2301 specifies the ID of the MAC device that has been selected by the receive scheduler. Lastly, an RP field (bits 2:0) 230m specifies which port of the MAC device specified in the RM field 2301 has been selected.

The RSM 166 reads the RCV_REQ register entry 231 to determine how it should receive data from the Fbus 132, that is, how the signaling should be performed on the Fbus, where the data should be placed in the RFIFO and which microengine thread should be signaled once the data is received. The RSM 166 looks for a valid receive request in the RCV_REQ FIFO 230. It selects the MAC device identified in the RM field and selects the specified port within the MAC by asserting the appropriate control signals. It then begins receiving data from the MAC device on the Fbus data lines. The receive state machine always attempts to read either eight or nine quadwords of data from the MAC device on the Fbus as specified in the receive request. If the MAC device asserts the EOP signal, the RSM 166 terminates the receive early (before eight or nine accesses are made). The RSM 166 calculates the total bytes received for each receive request and reports the value in the RCV_CNTL register 232. If EOP is received, the RSM 166 determines the number of valid bytes in the last received data cycle.

The RCV_CNTL register 232 is mapped to a four-entry FIFO (referred to herein as RCV_CNTL_FIFO 232) that is written by the receive state machine and read by the microengine thread. The I/O bus interface 28 signals the assigned thread when a valid entry reaches the top of the RCV_CNTL FIFO. When a microengine thread reads the RCV_CNTL register, the data is popped off the FIFO. If the SIGRS field 230i is set in the RCV_REQ register 230, the receive scheduler thread 92 specified in the RCV_CNTL register 232 is signaled in addition to the thread specified in TID field 230k. In this case, the data in the RCV_CNTL register 232 is read twice before the receive request data is retired from the RCV_CNTL FIFO 232 and the next thread is signaled. The receive state machine writes to the RCV_CNTL register 232 as long as the FIFO is not full. If the RCV_CNTL FIFO 232 is full, the receive state machine stalls and stops accepting any more receive requests.

Figure 10B:
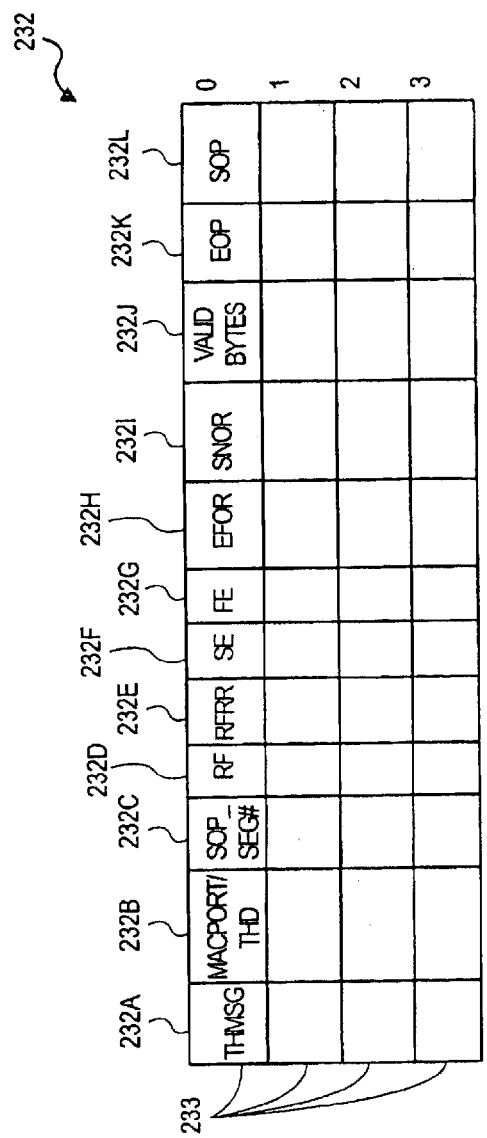

Referring to FIG. 10B, the RCV_CNTL FIFO 232 provides instruction to the signaled thread (i.e., the thread specified in TID) to process the data. As indicated above, the RCV_CNTL FIFO includes 4 entries 233. The format of the RCV_CNTL FIFO entry 233 is as follows: a THMSG field (31:30) 23a includes the 2-bit message copied by the RSM from RCV_REQ register[28:27]. A MACPORT/THD field (bits 29:24) 232b specifies either the MAC port number or a receive thread ID, as will be described in further detail below. An SOP SEQ field (23:20) 232c is used for fast ports and indicates a packet sequence number as an SOP (start-of-packet) sequence number if the SOP was asserted during the receive data transfer and indicates an MPKT sequence number if SOP was not so asserted. An RF field 232d and RERR field 232e (bits 19 and 18, respectively) both convey receive error information. An SE field 232f (17:14) and an FE field 232g (13:10) are copies of the E2 and E1 fields, respectively, of the RCV_REQ. An EF field (bit 9) 232h specifies the number of RFIFO elements which were filled by the receive request. An SN field (bit 8) 232i is used for fast ports and indicates whether the sequence number specified in SOP_SEQ field 232c is associated with fast port 1 or fast port 2. A VLD BYTES field (7:2) 232j specifies the number of valid bytes in the RFIFO element if the element contains in EOP MPKT. An EOP field (bit 1) 232k indicates that the MPKT is an EOP MPKT. An SOP field (bit 0) 2321 indicates that the MPKT is an SOP MPKT.

The thread done registers 240 can be read and written to by the threads using a CSR instruction. Using these registers, the receive scheduler thread can determine which RFIFO elements are not in use. The THREAD_DONE CSRs 240 support a two-bit message for each microengine thread. The assigned receive thread may write a two-bit message to this register to indicate that it has completed its task. Each time a message is written to the THREAD_DONE register, the current message is logically ORed with the new message. The bit values in the THREAD_DONE registers are cleared by writing a "1", so the scheduler may clear the messages by writing the data read back to the THREAD_DONE register. The definition of the 2-bit status field is determined in software.

The assigned receive processing threads write their status to the THREAD_DONE register whenever the status changes. When the receive scheduler reads the THREAD_DONE register, it can look at the returned value to determine the status of each thread and then update its thread/port assignment list.

The packet rate of a fast port (e.g., a Gigabit port) is such that the rate at which the receive state machine reads MPKTs from a single port is so fast that a receive thread may not be able to process an MPKT before the receive state machine brings in another MPKT from the same port. That is, a fast port may require the use of a number of RFIFO elements and receive threads in parallel to maintain full line rate. The amount of processing required for an MPKT may include header processing (e.g., header modification, forward lookup) or simply moving a packet body fragment to memory.

Fast packets and, in some cases, fast MPKTs (i.e., MPKTs which make up packets received from fast ports) can be processed in parallel and by different threads, so there is a need to maintain intra-packet order and inter-packet order for a given port. Thus, to maintain packet order for packets received from fast ports, the network processor 12 uses sequence numbers, one set for each high-speed port. Each set of sequence numbers provides a network packet sequence number, an MPKT sequence number and an enqueue sequence number. These sequence numbers are maintained as 4-bit counters within the I/O bus interface 28 and automatically roll over to zero once they reach a count of fifteen.

Figure 11A:
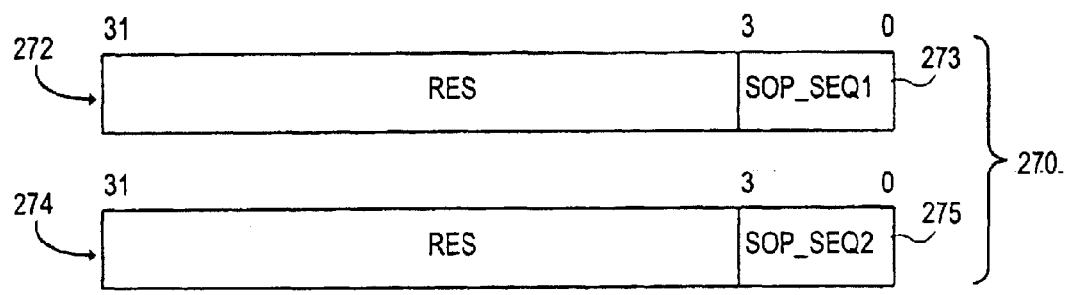
FIGS. 11A–11B are illustrations of the formats of the SOP_SEQx registers and ENQUEUE_SEQx registers, respectively.
Figure 11B:
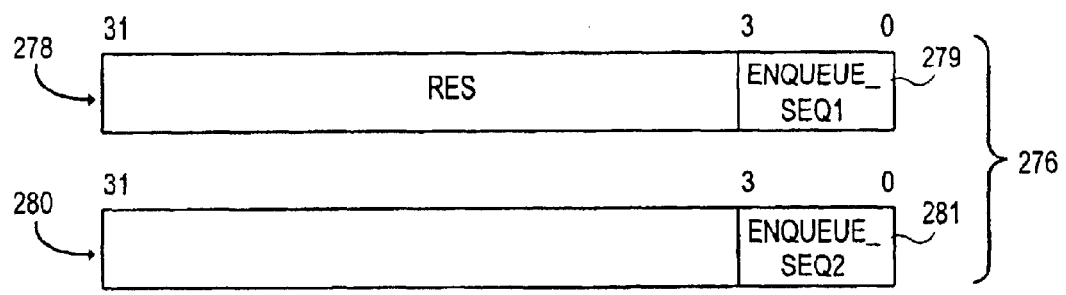

The sequence numbers are maintained in Fbus receive registers (CSRs). Referring to FIG. 11A, sequence numbers registers 270 include an SOP_SEQ1 register 272 having an SOP_SEQ1 field 273 and an SOP_SEQ2 register 274, which has an SOP_SEQ2 field 275. These fields store SOP sequence numbers for their respective fast ports and are incremented by the RSM. Referring to FIG. 11B, enqueue sequence number registers 276 include an ENQUEUE_SEQ1 register 278 having an ENQUEUE_SEQ1 field 279 for storing an enquence sequence number for fast port 1 and an ENQUEUE_SEQ2 register 280, which includes an ENQUEUE_SEQ2 field 281 for storing enqueue SOP sequence number for fast port 2. The enqueue sequence numbers are incremented by the receive processing threads.

The network packet sequence number in either the SOP_SEQ1 register (for fast port 1) or SOP_SEQ2 register (for fast port 2) register is placed into the RCV_CNTL register, and incremented at the same time. The receive state machine increments the packet sequence numbers in a manner that allows the receive processing threads to track not only the sequence of the network packets, but also the sequence of the individual MPKTs. If the SOP signal is detected during a receive request, the network packet sequence number provides a sequence number based on a network packet (hereinafter referred to as an SOP sequence number). If the SOP signal is not detected during a receive request, the packet sequence number is based on an MPKT (hereinafter, MPKT sequence number). The receive threads can determine the type of packet sequence number since the RCV_CNTL register contains both the packet sequence number and SOP status.

The SOP and MPKT sequence numbers for each fast port are implemented as 4-bit counters. The SOP sequence number counter is incremented each time an SOP is detected. An MPKT sequence number counter receives the SOP sequence number whenever the SOP signal is asserted, and is incremented once per receive request when the SOP signal is not detected.

The enqueue sequence numbers are used by the receive processing threads to determine whether it is their turn to place a complete network packet onto a transmit queue. When an entire network packet has been received, the receive processing thread reads the enqueue sequence number from the appropriate enqueue_seq register. If the enqueue sequence number matches the SOP sequence number assigned to the packet, the receive processing thread can place the packet onto a transmit queue. If the enqueue sequence number does not match, the receive processing thread waits for a "sequence number change" signal event to occur. When the event occurs, the receive processing thread reads the enqueue sequence number again and checks for a match. If a match occurs, the packet may be placed onto a transmit queue.

After a packet is placed on a transmit queue, the receive processing thread increments the enqueue sequence number. The enqueue sequence numbers are incremented by writing to either the ENQUEUE_SEQ1 or ENQUEUE_SEQ2 register. A receive processing thread may choose to write its processing status to the THREAD_DONE register as well as increment the enqueue sequence number at the same time. This can be accomplished with a single write instruction to additional CSRS, a THREAD_DONE_INCR1 register or the THREAD_DONE_INCR2 register (not shown).

The receive scheduler thread controls the rate at which it issues receive requests. It issues a number of receive requests that is no more than that required by a port, but is sufficient to prevent an overflow of that port's receive FIFO.

When using slower ports, such as 10/100 BaseT Ethernet ports, the receive scheduler thread reads the MAC receive FIFO ready flags for multiple ports, determines which ports have data available, and issues receive requests based on the knowledge that data is available in the MAC receive FIFO. Since it reads multiple receive FIFO ready flags each time, it can issue multiple receive requests before it has to read the flags again.

Because fast ports operate at a much higher data rate than slow ports and the latencies associated with certain tasks, e.g., reading the receive ready flags from a port or from the RCV_RDY_HI/LO registers, writing a receive request to RCV_REQ, may be greater than that packet arrival rate, the rate at which a single MAC port must be serviced cannot be sustained by issuing receive requests only when data is known to be available in a device port receive FIFO.

Therefore, the receive scheduler thread uses speculative requests for high-speed ports. That is, the receive scheduler thread issues multiple receive requests to a port based on the speculation that there is data available in that port's receive FIFO. At the time the RSM 166 processes each receive request, it determines if data is actually available at the port. Based on this determination, the RSM 166 either processes or cancels the request.

The RSM 166 determines whether there is data available at either of the two fast ports by reading the fast receive ready pins (FAST_RX1 214a and FAST_RX2 214b of FIG. 7). These pins 214a, 214b provide a direct connection to their respective MAC port's receive FIFO ready flag. The MAC ports assert these signals when the receive FIFO fullness threshold level is reached or an entire packet has been received.

If a fast ready pin in not asserted, the RSM 166 cancels the pending request and writes a cancel message into the RCV_CNTL register's message field. It then signals the assigned receive processing thread. The receive processing thread is programmed to read the RCV_CNTL register, interpret the cancel message correctly and indicate to the receive scheduler thread that it is available for other tasks.

The state of the two fast ready pins is indicated in the FRDY2 field 216d (for port 2) and FRDY1 field 216e (for port 1) of the RCV_RDY_CNT register 216 (shown in FIG. 8A). The receive scheduler thread reads the fast ready flags from the RCV_RDY_CNT register 216 fields 21 6d, 216e on a periodic basis to determine when it should issue receive requests. It issues enough receive requests to cover the data that might have arrived in the MAC port 33 since the last time it read the fast ready flags.

The receive state machine 166 supports three fast port modes that determine how receive processing threads are assigned to process packet data in the RFIFO. These fast port modes are referred to as single thread, header/body thread and explicit thread modes. When selecting a mode, the network processor considers the following: availability of threads to process each receive request; execution time for the receive thread. The modes need to understand where one network packet ends and the next one begins. To that end, they rely on the beginning of the network packet as corresponding to the assertion of SOP and the ending of the network packet corresponding to the assertion of EOP. Referring back to FIG. 6B, the fast port mode field 174b of RCV_RDY_CTL register 176 defines the three modes as single thread 00', header/body 01' and explicit 10'.

The single thread mode assigns a single thread to each packet when using speculative requests. If the single thread mode is specified in the RCV_RDY_CTL register 176 and fast port thread mode (RCV_REQ[17:16]) is set, the RSM 166 performs in the following manner. If the RSM 166 detects an SOP in the receive data transfer for the MPKT, it signals the thread specified in the RCV_REQ register 230. That is, it writes the thread ID of the specified thread to the TID field 230k. It also saves that thread ID in the appropriate header field of the REC_FASTPORT_CTL register 176. If SOP is not detected, the RSM 166 ignores the thread ID specified in the RCV_REQ register and signals the thread specified in the header field in the REC_FASTPORT_CTL register. The RSM 166 writes the unused thread ID to the RCV_CNTL register MACPORT/THD field 232b. The unused ID is returned to the receive scheduler thread so the receive scheduler thread can update its thread availability list. To return the thread ID, the RSM 166 signals the receive thread when the receive request is complete and the receive thread passes the unused thread ID to the receive scheduler using inter-thread communications. Alternatively, the receive scheduler thread can request that it be signaled as well as the receive processing thread after the RSM completes the receive request. In this case, RCV_CNTL must be read twice before data is removed from the RCV_CNTL FIFO. In most cases, the receive processing thread reads it once and the receive scheduler thread also reads it once. If two reads are not performed, the RSM stalls. In another alternative, the RSM signals the receive processing thread when the receive request is complete and the receive processing thread returns the unused thread to the receive scheduler thread using an inter-thread signaling register which, like the thread done registers, has a bit for each thread and is read periodically by the receive scheduler to determine thread availability. It sets the bit corresponding to the unused thread ID in that register, which is then read by the receive scheduler thread.

In the header/body mode, two threads are assigned to process the MPKTs within a network packet. The first thread serves as the header thread and is responsible for processing the header to determine how to forward the packet. The second thread is the body thread, which is responsible for moving the remainder of the packet to the SDRAM. When the body thread completes its task, it uses inter-thread signaling to notify the header thread where the body of the packet is located. The header thread can then place the packet onto a transmit queue.

The RSM 166 supports the header and body threads in the following manner. If the RSM 166 detects an SOP, it signals the thread specified in RCV_REQ register and saves the thread number in the header field of REC_FASTPORT_CTL register 176. When it processes the next request, it signals the thread specified in RCV_REQ register 230 and saves the thread number in the body field of REC_FAST_PORT_CTL register 176. From this point forward, the RSM ignores the thread ID presented in the RCV_REQ register 230 and signals the body thread specified in REC_FASTPORT_CTL register 176. The RSM writes the unused thread ID to the RCV_CNTL register's MACPORT/THD field 232b. As with the single thread mode, the unused thread ID is returned to the receive scheduler thread so the receive scheduler thread knows that the thread is available for processing.

In explicit thread mode, the RSM always uses the thread assignment in the receive request as indicated by the RCV_REQ register 230. In this mode, the receive scheduler thread provides each receive processing thread with the ID of the thread assigned to the next MPKT receive request so that the thread can signal the next assigned thread for the next consecutive MPKT that is it done, the exception being the last thread in line, which receives instead the thread ID of the header thread. Additionally, each thread provides the next assigned thread with a pointer to the buffer memory, thus ensuring the MPKTs for a given network packet are queued in packet memory in the order in which they arrived. Once the thread assigned to the EOP MPKT has completed processing and has been signaled by the thread for the previous MPKT, it notifies the header thread that the entire packet can be enqueued on the transmit queue, provided, that is, that the enqueue sequence number matches the SOP sequence number of the MPKT processed by the header thread. The MPKT sequence number is provided to ensure that MPKTS are queued in the correct order.

Figure 12:
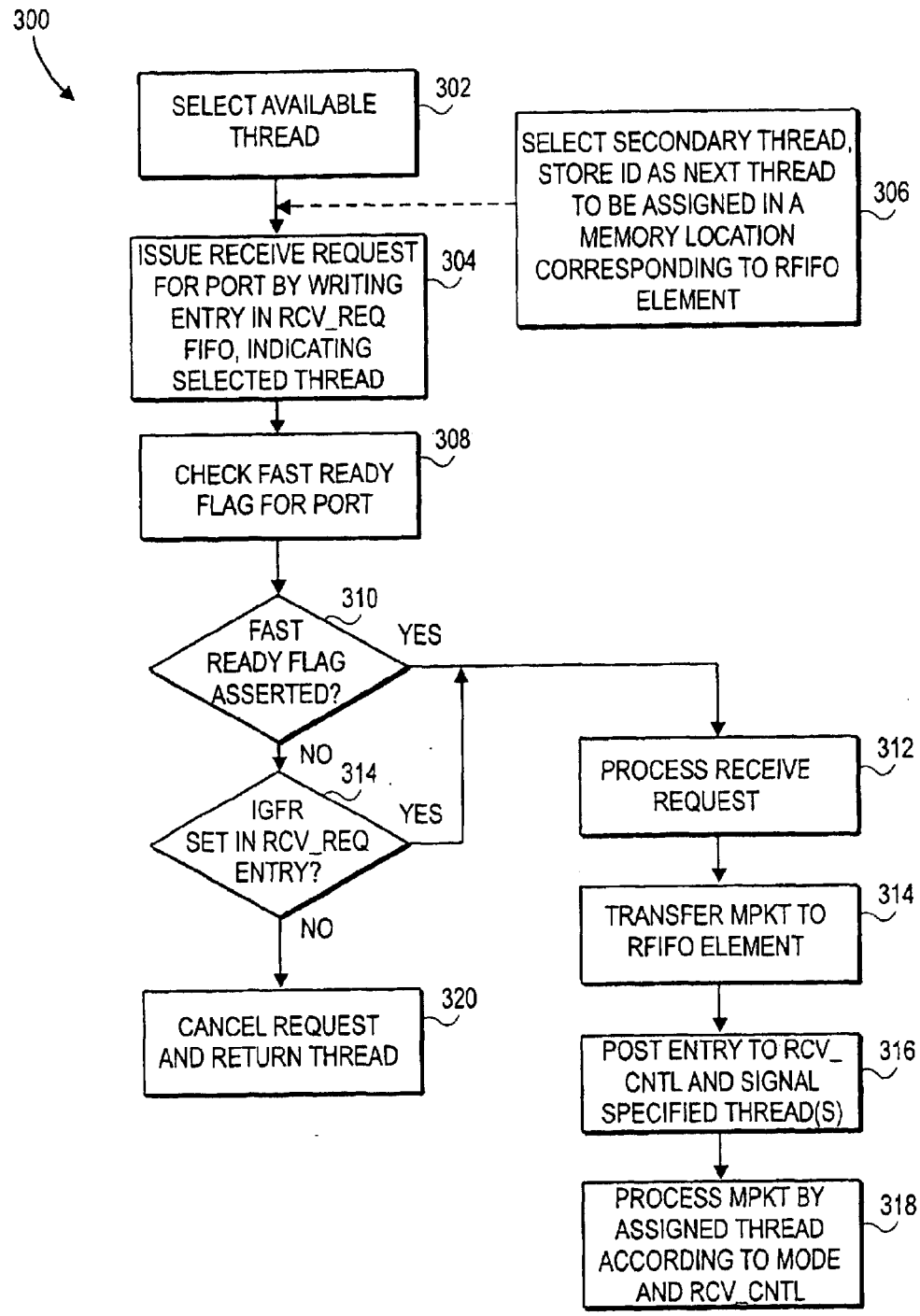
FIG. 12 is a flow diagram of the receive process for fast ports.

Referring to FIG. 12, an overview of the fast port receive processing for a selected fast port 300 is shown. The receive scheduler thread selects or assigns 302 an available thread to the port and issues 304 a receive request specifying the assigned thread. As noted in dashed lines, in explicit mode, the scheduler selects 306 a secondary thread as a thread to be assigned in the next receive request and stores the secondary thread in a memory location designated as corresponding to the RFIFO element to which it will be written. The RSM checks 308 the fast ready flag for the fast port. The RSM determines 310 if it is asserted. If it is asserted, the RSM processes 312 the receive request, and responds to the request by transferring 314 the requested MPKT into an RFIFO element indicated by the request, and performs the step of posting 316 a RVC_CNTL FIFO entry (according to the fast port mode specified in the RCV_RDY_CTL register 174) to the RCV_CNTL FIFO and, at the same time, signaling the assigned thread (and any other threads, e.g., the scheduler, as specified by the request). Once these steps are completed, the assigned receive processing thread processes 318 the MPKT as instructed by the control information in the RCV_CNTL register and the fast port mode. If the ready flag is not asserted, it determines 319 if the IGFR field is set in the RCV_REQ entry. If not set, the RSM cancels 320 the request and returns the ID of the thread. If it is set, the RSM proceeds to process the request.

Figure 13A:
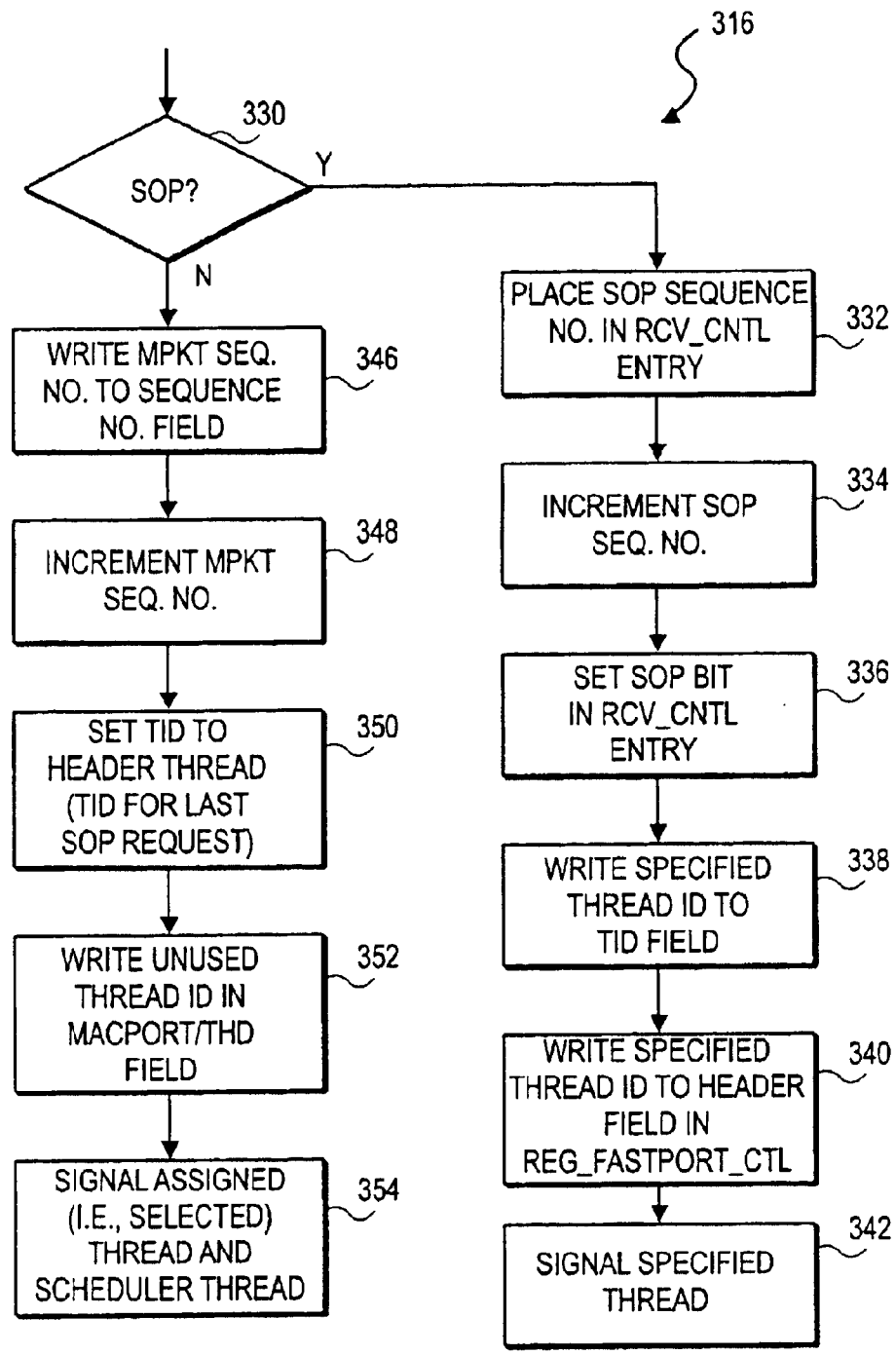
FIGS. 13A and 13B are flow diagrams which illustrate portions of the receive process for fast ports using a single thread mode.

Referring to FIG. 13A, the RCV_CNTL entry posting and thread signaling of 316 (FIG. 12) includes, for the single thread mode, the following. The RSM determines 330 if SOP is asserted during the receive data cycle. If so, it places 332 the SOP sequence number in the SOP_SEQ field, increments 334 the SOP_SEQx counter, sets 336 the SOP bit, writes 338 the specified thread ID to the TID field as well as saves 340 it in the REC_FASTPORT_CTL register header field for the appropriate fast port. It signals 342 the specified thread. If SOP is not asserted, the RSM writes 346 the MPKT sequence number to the sequence number field, and increments 348 that number. It sets 350 the TID field to the ID of the thread indicated in the header field of the REC_FASTPORT_CTL register (i.e., the TID for the last MPKT that was an SOP MPKT). It also writes 352 the unused receive processing thread, that is, the thread specified by the receive request to the MACPORT/THD field. It signals 354 both the assigned thread and the scheduler to read the register, the assigned thread so that it knows how to process the packet and the receive scheduler thread so that it knows the specified thread was not used and is therefore available for a new assignment.

Figure 13B:
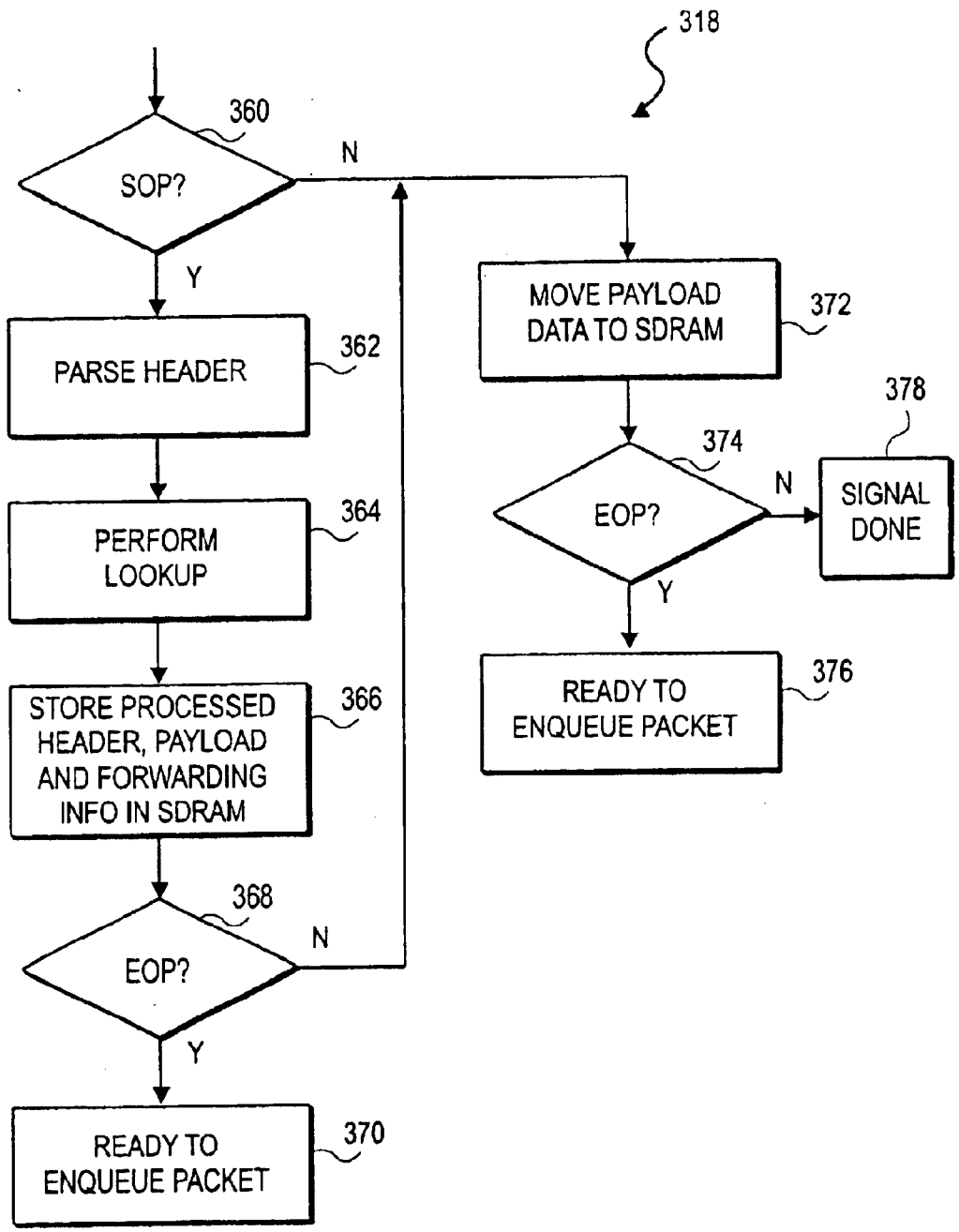

Referring to FIG. 13B, the processing of the MPKT (318, FIG. 12) for the single thread mode is as follows. If the assigned processing thread determines 360 that the MPKT is as SOP MPKT (as indicated by the RCV_CNTL register), the assigned processing thread parses 362 the header and performs a lookup 364 (based in the header and hash information retrieved from the hash table). It moves 366 both the header as processed, along with forwarding information stored in the SDRAM forwarding tables and the remainder of the MPKT (i.e., payload) into a temporary queue in packet buffer memory. If it determines 368 that the MPKT is an EOP, then the assigned thread assumes 370 that the packet is ready to be enqueued in the transmit queue for the forwarding port indicated by the forwarding information. The enqueuing process will be described with reference to FIG. 16. If the MPKT is not an SOP, the processing thread moves 372 the payload data to buffer memory (in SDRAM) and then determines 374 if it is an EOP. If it is an EOP, the processing thread is ready to enqueue the packet 376. It the MPKT is not an EOP, then the processing thread signals 378 that it is done (via inter-signaling methods, e.g., write thread done register).

Figure 14A:
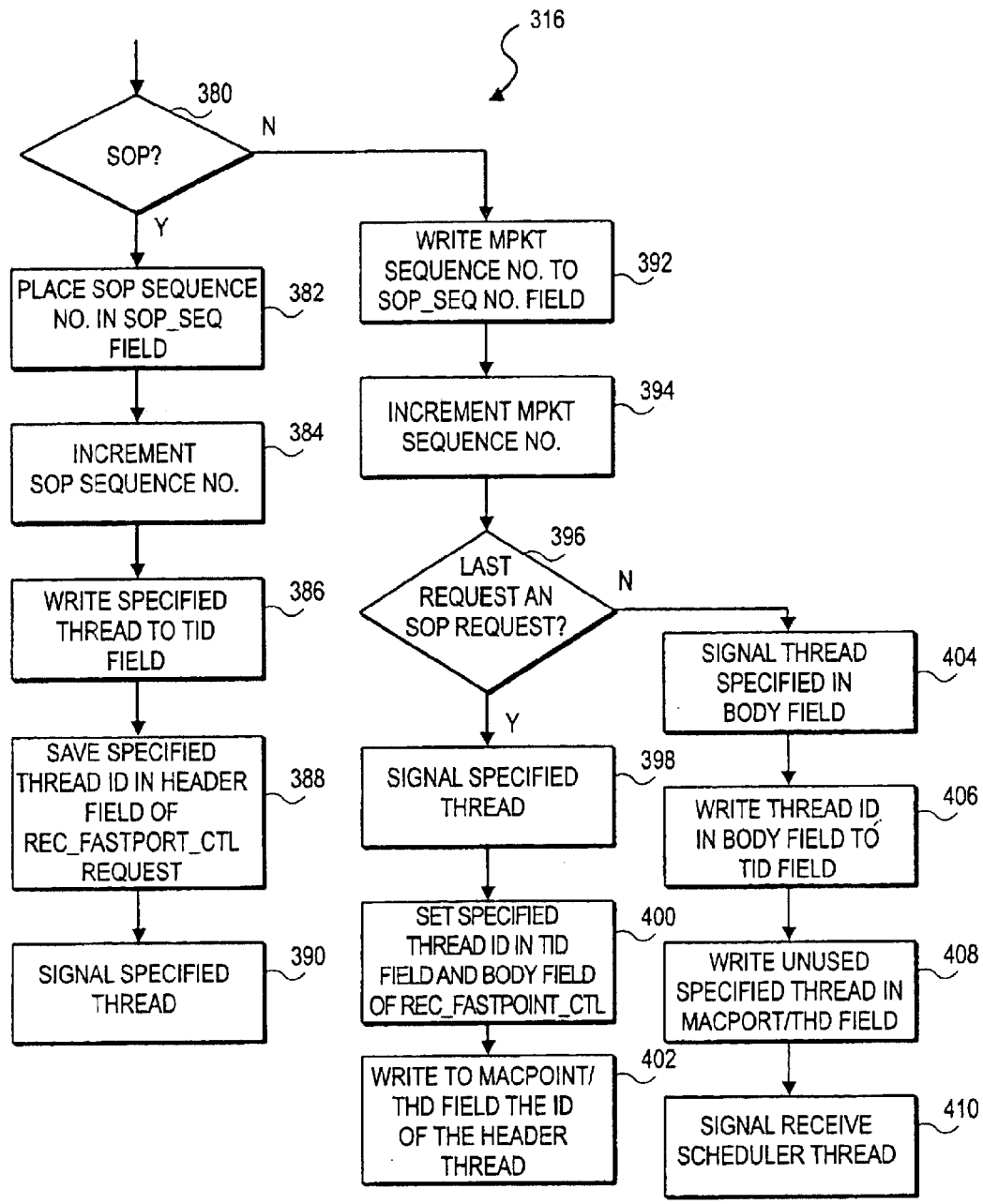
FIGS. 14A and 14B are flow diagrams which illustrate portions of the receive process for fast ports using a dual thread (or header/body) mode.

Referring to FIG. 14A, the RCV_CNTL entry posting and signaling of threads 316 includes, for the dual (or header/body) thread mode, the following. The RSM determines 380 if SOP is asserted during the receive data cycle. If so, it places 382 the SOP sequence number in the SOP_SEQx field, increments 384 the SOP_SEQx counter, writes 386 the specified thread ID to the TID field as well as saves 388 it in the REC_FASTPORT_CTL register header field for the appropriate fast port. It signals 390 the specified thread. If SOP is not asserted, the RSM writes 392 the MPKT sequence number to the sequence number field, and increments 394 that number. It determines 396 if the last request was for an SOP MPKT. If so, it signals 398 the specified thread, sets 400 the ID of that thread in the TID field as well as the appropriate body field of the REC_FASTPORT_CTL register. It also indicates 402 in the MACPORT/THD field the ID of the header thread (so that the header thread may be signaled when the entire packet has been received and processed). If the last request was not an SOP MPKT, the RSM signals 404 the thread specified in the body, writes 406 that ID to TID field and specifies 408 the ID of the unused thread of the receive request in the MACPORT/THD field (to return to the pool of available receive processing threads). It also signals 410 the scheduler so that the scheduler, in addition to the signaled receive processing thread, may read the rec_cntl register entry before it is removed from the RCV_CNTL FIFO.

Figure 14B:
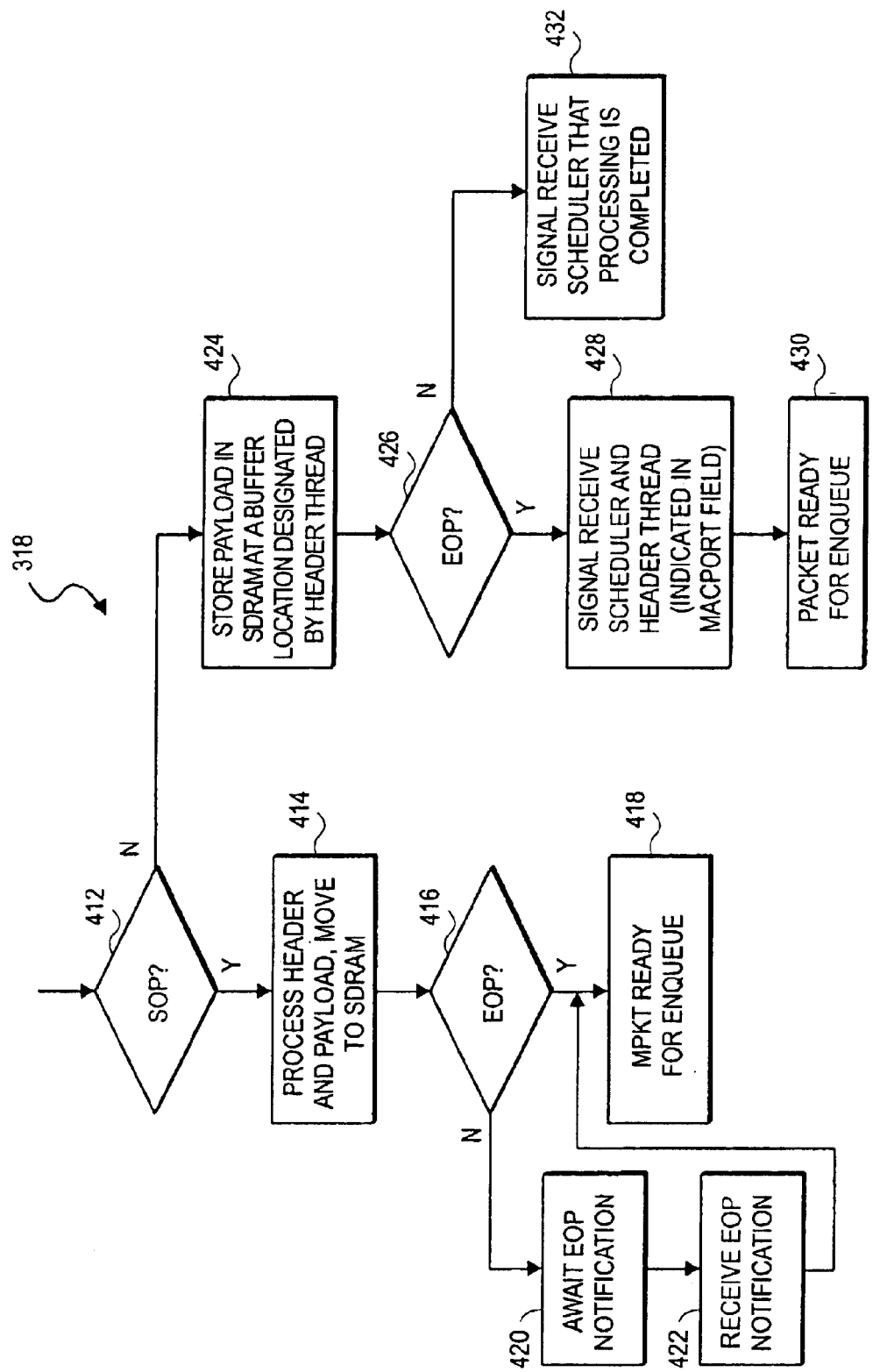

Referring to FIG. 14B, the MPKT is processed by the "assigned" thread in the dual thread mode as follows. If the thread determines 412 that the MPKT is an SOP MPKT, it processes 414 the header and payload data in the same manner as described above (i.e., parses the header, etc.). If it determines 416 that the MPKT being processing is an EOP, that is, the MPKT is a minimum sized network packet, then it assumes 418 the MPKT is ready for enqueuing. If the MPKT is not the last MPKT in a packet, then the thread (which is the header thread) awaits notification 420 of EOP. Once it receives such notification 422, the packet is ready to be enqueued in the transmit queue. If the MPKT is not an SOP but the continuation of a packet, the thread stores 424 the payload in the temporary queue in SDRAM at a buffer location designated by the header thread. If it determines 426 that the MPKT is an EOP, then it signals 428 to the scheduler and the header thread (as identified in the MACPORT/THD field) that it is done. It thus determines 430 that the complete packet is now ready to be enqueued. If the MPKT is not an EOP, it simply signals 432 to the scheduler that it is done processing its MPKT and is available for work.

Figure 15A:
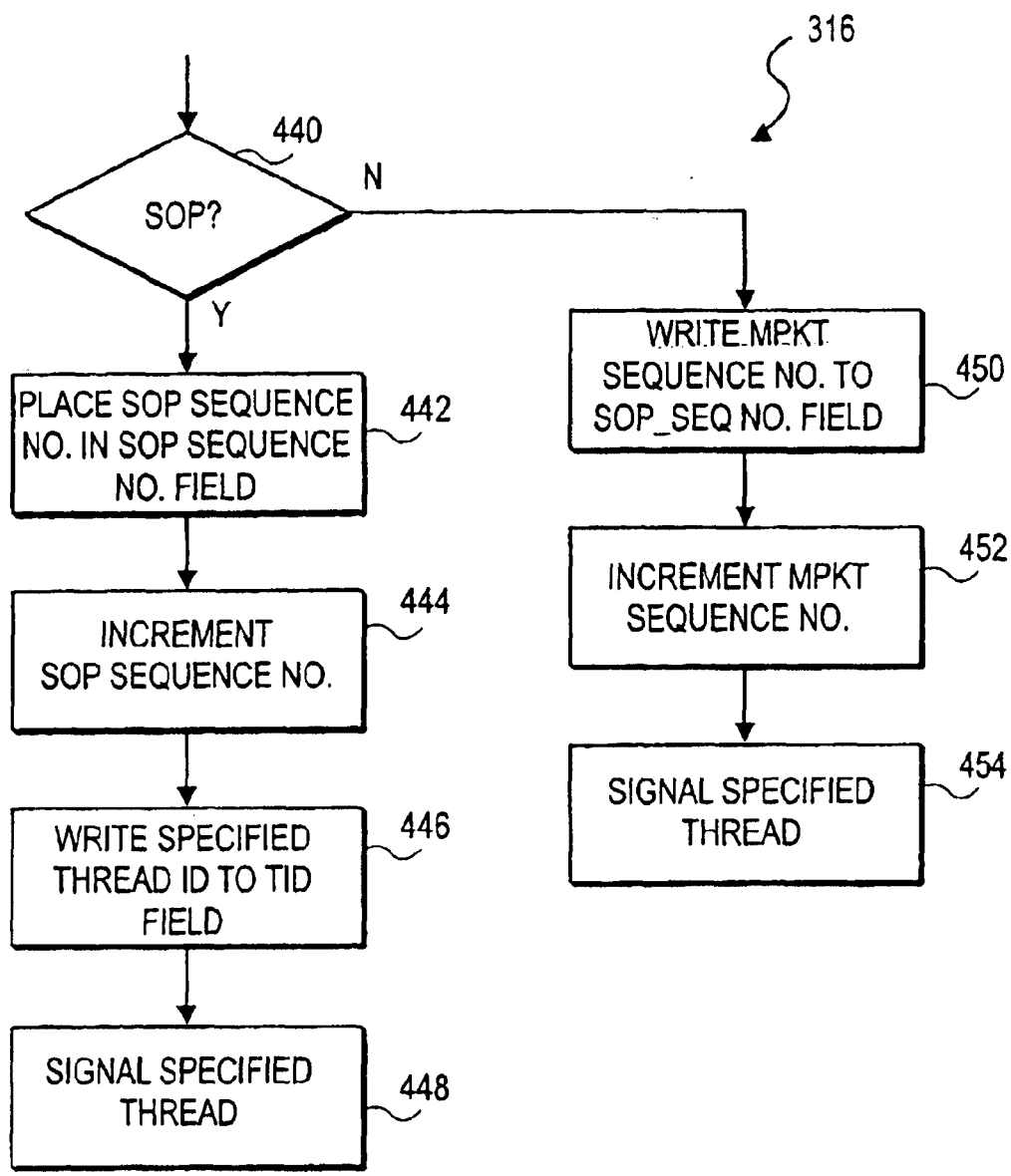
FIGS. 15A and 15B are flow diagrams which illustrate portions of the receive process for fast ports using an explicit (distributed thread) mode.

Referring to FIG. 15A, the posting of the RCV_CNTL entry and signaling of threads includes, for the explicit mode, the following steps. As in the other fast port modes, the RSM determines 440 if SOP is asserted during the receive data cycle. If so, it places 442 the SOP sequence number in the SOP_SEQx field, increments 444 the SOP_SEQx counter, writes 446 the specified thread ID to the TID field. It signals 448 the specified thread. If SOP is not asserted, the RSM writes 450 the MPKT sequence number to the sequence number field, increments 452 that number and signals 454 the specified thread.

Figure 15B:
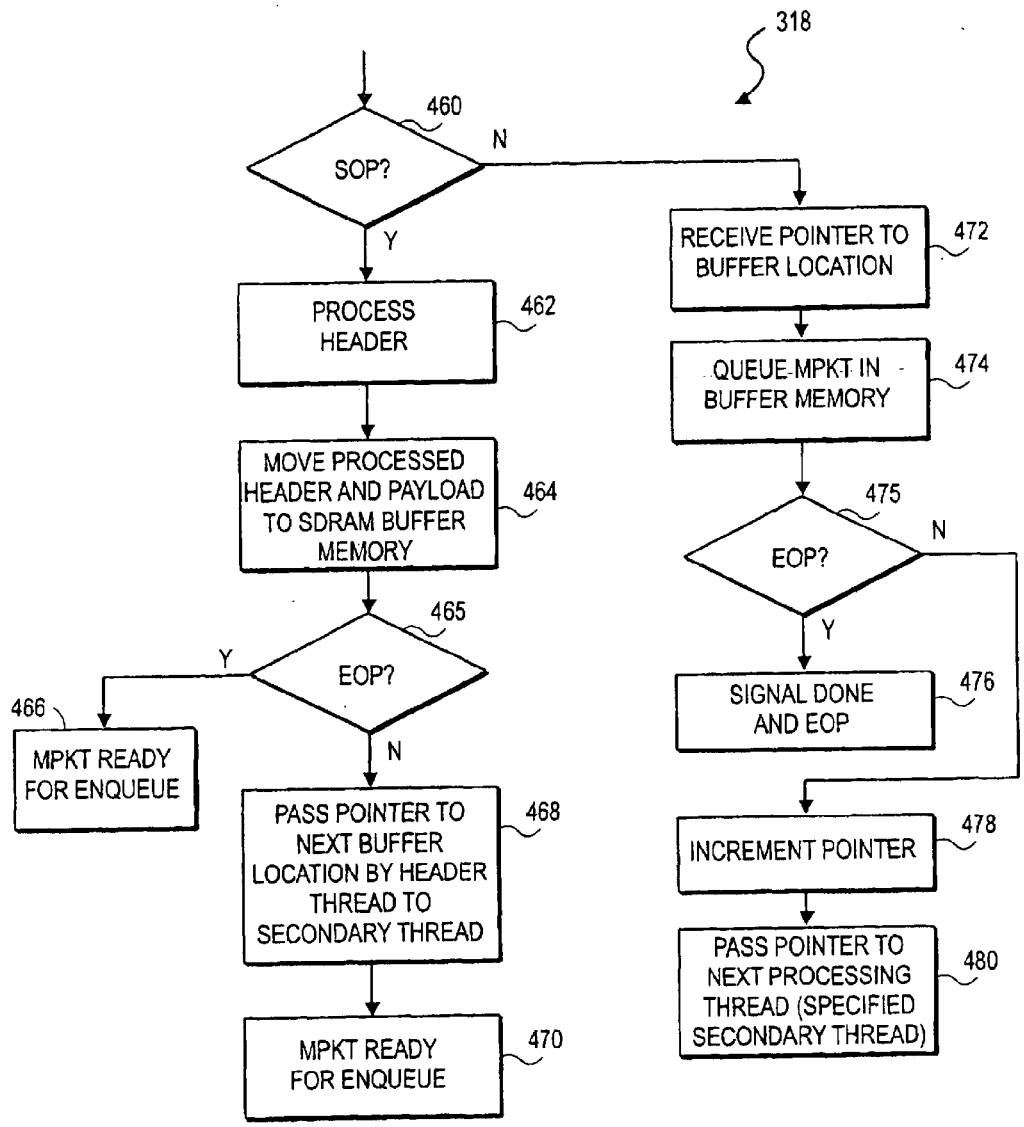

Referring to FIG. 15B, the receive thread processing the fast port MPKT according to the explicit mode as follows. If the specified thread determines 460 that the MPKT is an SOP MPKT, the specified thread processes 462 the header, moves the payload and processed header to buffer memory 464. If it determines 465 that an EOP bit is set in the RCV_CNTL register entry, then it concludes 466 that the MPKT is ready to be enqueued in the appropriate port transmit queue. If the EOP is not set, that is, the MPKT is not an EOP MPKT, the thread (in this case, the header thread) passes 468 a pointer to the next available buffer location to the secondary thread ID that was specified by the scheduler in a common location corresponding to the RFIFO element in which the MPKT was stored. It then awaits notification 470 from the EOP thread. If the MPKT is not an SOP MPKT, it receives 472 a pointer to a buffer location in SDRAM and queues 474 the MPKT in the buffer memory at the location pointed to by the pointer. If the thread determines 475 that the MPKT is an EOP MPKT, the thread signals 476 that it is done and that the MPKT is an EOP so that the header thread know that the network packet to which this EOP MPKT belongs is ready to be enqueued in the transmit queue. If the MPKT is not an EOP, the processing thread increments 478 the pointer to the next available buffer location and passes 480 the pointer to the thread processing the next, consecutive MPKT, that is, the ID specified by the scheduler as the secondary thread in a memory location corresponding to the RFIFO element in which the MPKT was stored.

Figure 16:
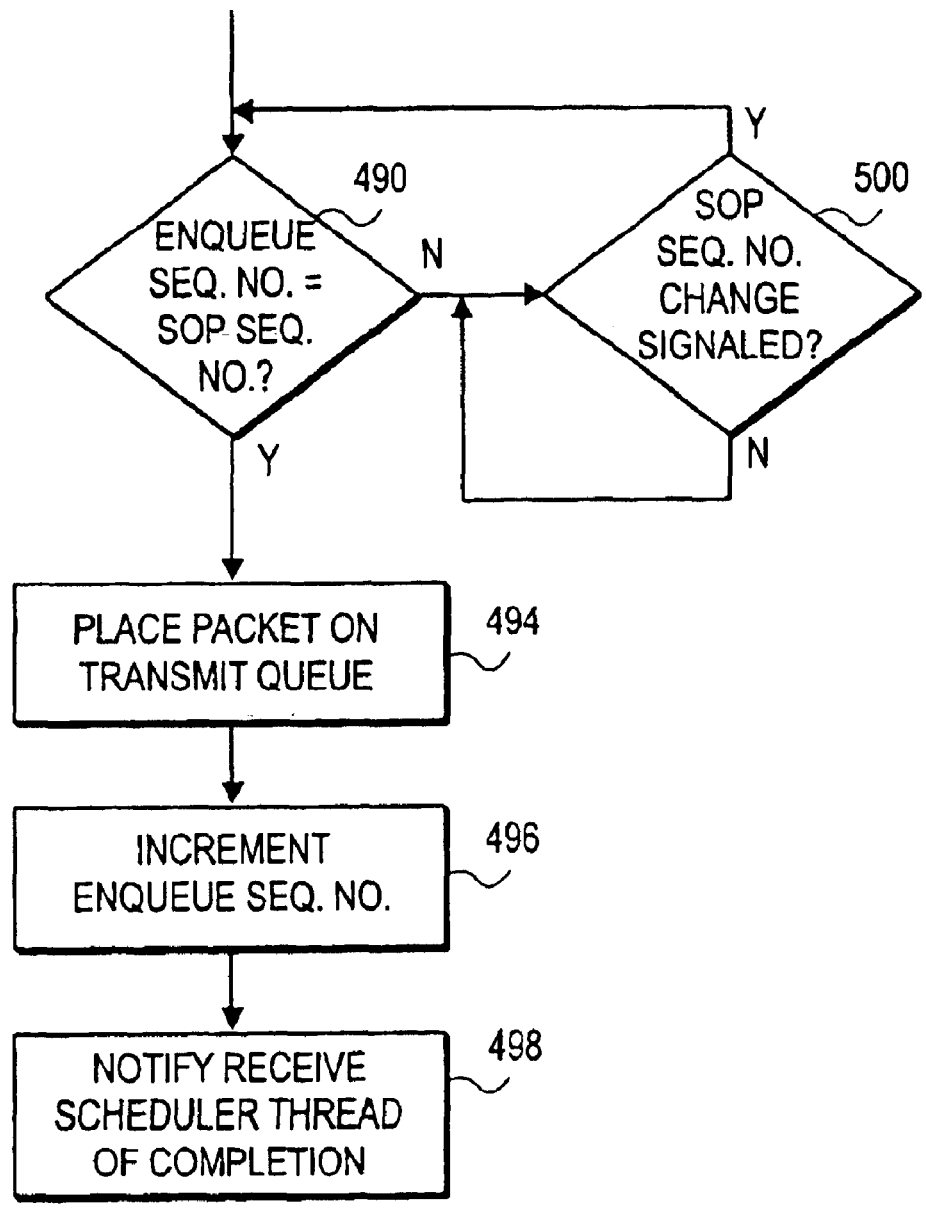
FIG. 16 is a flow diagram of a packet enqueuing process for fast ports.

Referring to FIG. 16, the process of enqueuing is illustrated. The header thread (which has identified an EOP or received notification of an EOP from another thread, as previously described), first determines if it is this particular packet's turn to be enqueued. It determines 490 if the enqueue sequence # is equal to the SOP sequence number that was associated with the SOP MPKT. If they are equal, the header thread links 494 the network packet (now stored in its entirety in the packet buffer memory in SDRAM) to the port transmit queue (located in SRAM). It increments 496 the enqueue sequence number and notifies 498 the scheduler of completion. If the SOP sequence number is not equal to the enqueue sequence number, it waits to receive a signal indicating that the SOP sequence number has changed 500 and again compares the two sequence numbers.

It will be appreciated that the processes depicted in FIGS. 12–16 assume that no packet exemptions occurred, that the thread are able to handle the packet processing without assistance from the core processor. Such assistance, if invoked, in no way changes the manner in which packet order is maintained. Further, the processes of FIGS. 12–16 assume the availability of FIFO, e.g., RFIFO, space. Although not described in the steps of FIGS. 12–16 above, it will be appreciated that the various state machines must determine if there is room available in a FIFO prior to writing new entries to that FIFO. If a particular FIFO is full, the state machine will wait until the appropriate number of entries has been retired from that FIFO.

Sequenced Transmit of Network Data

In one embodiment, two of the microengines 22a–f are designated as transmit microengines to help transmit data to various ports of the processor 12. In this embodiment, one thread of each of the two transmit microengines are programmed to be transmit schedulers, and the three other threads of each of the two microengines are programmed to be transmit processing threads ("also called transmit threads or fill threads").

The transmit microengines allow transmission of data at high rates using multiple programmable threads that are able to work on multiple packets and/or multiple sections of the same packet in parallel. The two transmit schedulers alternatingly assign transmit threads, which are designated EVEN and ODD, to process data to be forwarded out ports of the processor 12. The transmit threads take assignments from the transmit scheduler and transmit a packet section and perform queue and DRAM freelist updates. The transmit threads transfer MPKTs from memory such as SDRAM 18a to the TFIFO 134, from which they are sent out over the Fbus 132.

Figure 17:
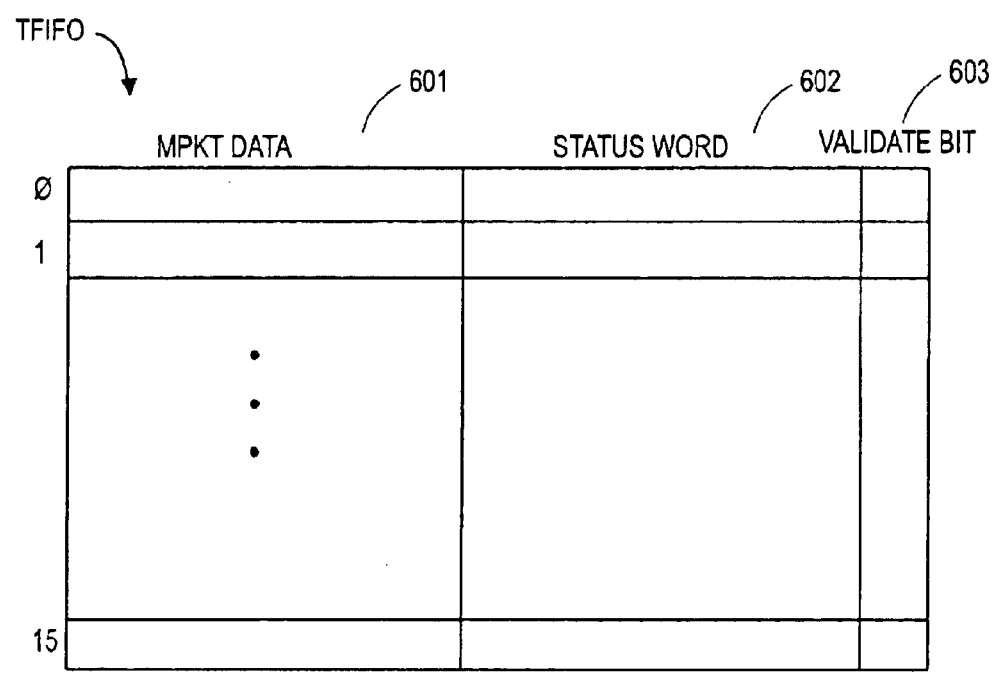
FIG. 17 shows one embodiment of TFIFO 134 that includes 16 elements.

FIG. 17 shows one embodiment of TFIFO 134 that includes 16 elements. The EVEN transmit threads write to elements 0, 2, 4, 6, . . . 14. The ODD transmit threads write to elements 1, 3, 5, 7, . . . 15. MPKTs are stored in the TFIFO 134 prior to being sent out one of the ports 32a–h. Each TFIFO data element 601 has an associated control word 602 and validate bit 603. The data elements in the TFIFO 134 are sent out the ports 32a–h via the I/O bus 16 upon receiving a validation indication along with control word information including bus port, byte count, and packet delimiters. TFIFO data elements can be skipped (so that they are not sent out a port) by setting a skip bit in the control word. Packet transmit order out of the TFIFO 134 is maintained regardless of individual packet transmit processing requirements, hardware thread priority, or packet size.

Figure 18:
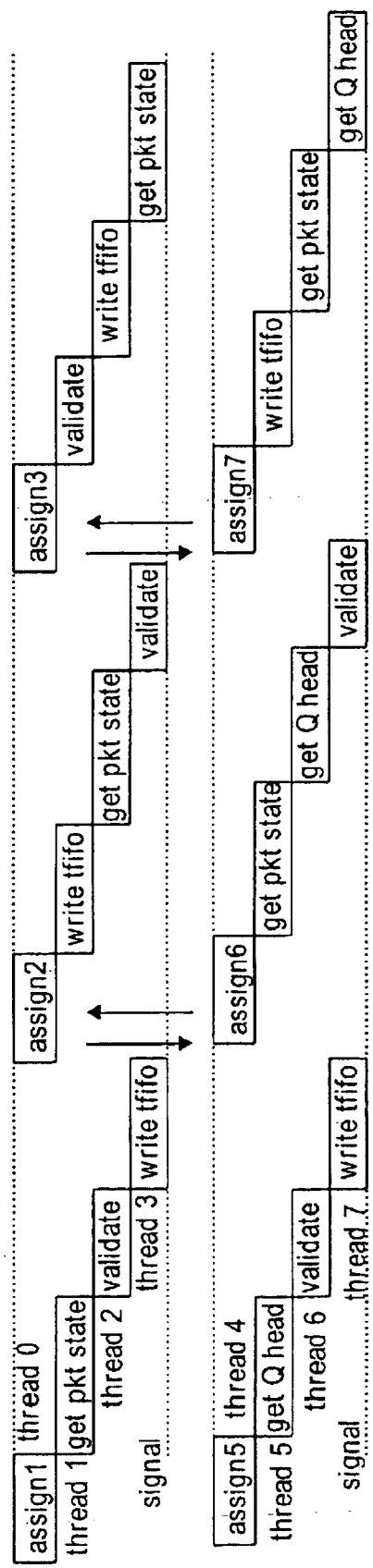
FIG. 18 shows a graphical overview of the assignment process showing two exemplary transmit schedulers and their respective three transmit threads.

FIG. 18 shows a graphical overview of the assignment process showing two exemplary transmit schedulers and their respective three transmit threads. The timeline for each thread is read horizontally across the figure. For example, thread 0 assigns (thread) 1, subsequently assigns (thread) 2, and later assigns (thread) 3. Thread 1 gets a packet state, subsequently writes control status to the TFIFO 134, and later validates the TFIFO element, as will be described in more detail.

Threads 0–3 run on one microengine 22a–f and threads 4–7 run on another microengine 22a–f. Threads 0 and 4 are transmit schedulers; threads 1–3 and 5–7 are transmit threads that carry out assignments made by transmit schedulers 0 and 4 respectively. Since the transmit threads can operate simultaneously, multiple portions of a packet can be processed at the same time.

The microengine with threads 0–3 is designated EVEN and the microengine with threads 4–7 is designated ODD. Since the TFIFO requires the data elements be sent in order, the EVEN transmit scheduler starts at and assigns a thread to work on TFIFO element 0. It then signals the ODD transmit scheduler, which assigns a thread to work on TFIFO element 1. The ODD scheduler then signals the EVEN transmit scheduler.

Figure 19:
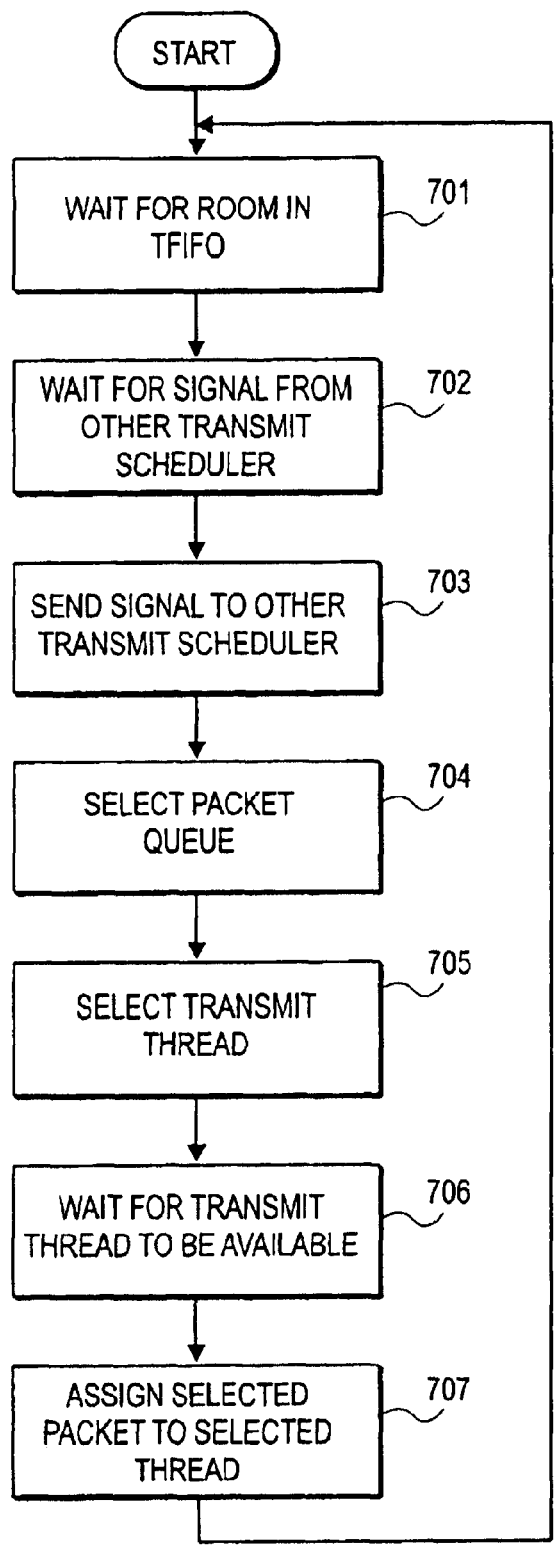
FIG. 19 shows a flowchart of the operation of a transmit scheduler.

FIG. 19 shows a flowchart of the operation of a transmit scheduler. The flowchart starts at box 701 at which the transmit scheduler determines if there is room in the TFIFO 134. In one embodiment, an output pointer points to the element of the TFIFO 134 which is the next to be output on the I/O bus. A counter "assigns in flight" keeps track of the number of transmit thread assignments made that have not yet made it on the I/O bus. The amount of room in the TFIFO can be determined by looking at the output pointer and the assigns in flight counter.

In an alternative embodiment, a MAC can be programmed to provide a ready indication when it has a predetermined amount of storage room. For example, if a MAC is programmed for 8 MPKT's of storage room, then when the ready indication is received, the TFIFO can send 8 MPKT's without worrying about overflowing the MAC. (Note there is some ambiguity if the output pointer indicates the next TFIFO element to be output, but doesn't indicate whether the previous element has actually been output yet.)

At box 702, the transmit scheduler waits for a signal from the other transmit scheduler. Once the signal is received, the transmit scheduler replies with its own signal (box 703). This allows the transmit schedulers to alternatingly assign transmit threads.

At box 704, the transmit scheduler selects a transmit queue based on the transmit queue prioritizations. The transmit queue includes descriptor information about a data packet. The transmit scheduler also selects a transmit thread (box 705) and waits for the transmit thread to become available (box 706). Once the transmit thread is available, the transmit scheduler assigns the selected packet to the selected thread (box 707) and the process loops back to box 701.

In an alternate embodiment, a fill thread waits until the output pointer is pointing to its TFIFO element (or to the prior TFIFO element corresponding to a different transmit scheduler and port) before validating the TFIFO element. In this case, the number of transmit scheduler assignments that were made no longer needs to be tracked.

Figure 20A:
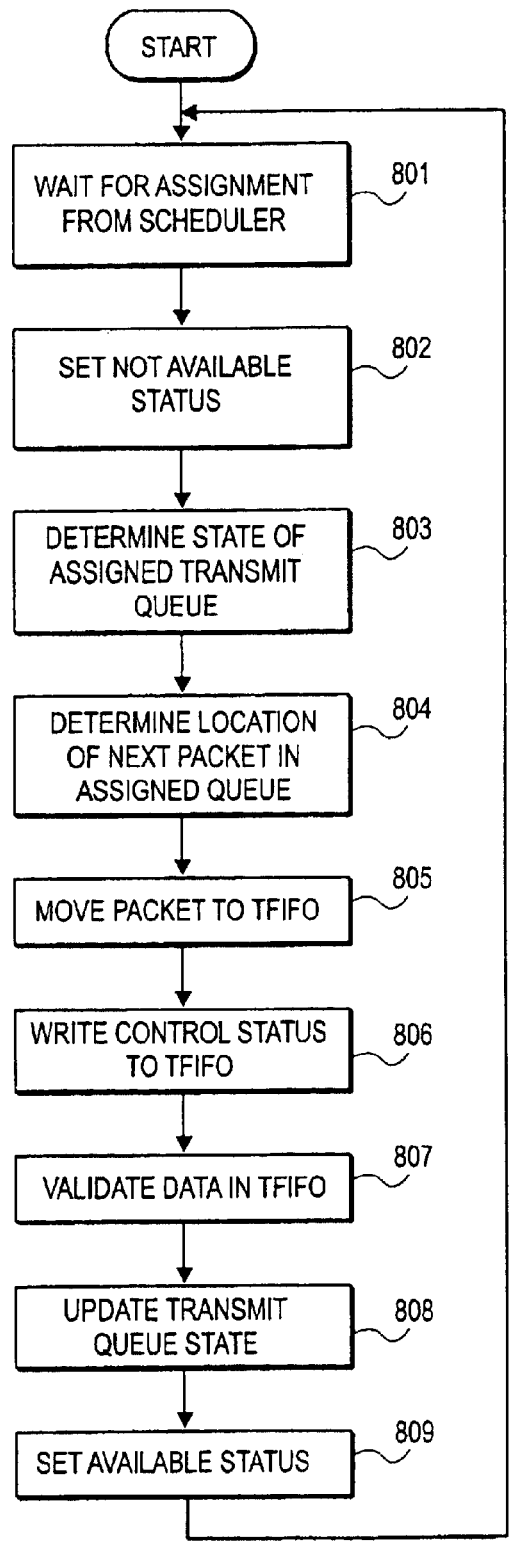
FIGS. 20A and 20B show flowcharts of the operation of a transmit thread.
Figure 20B:
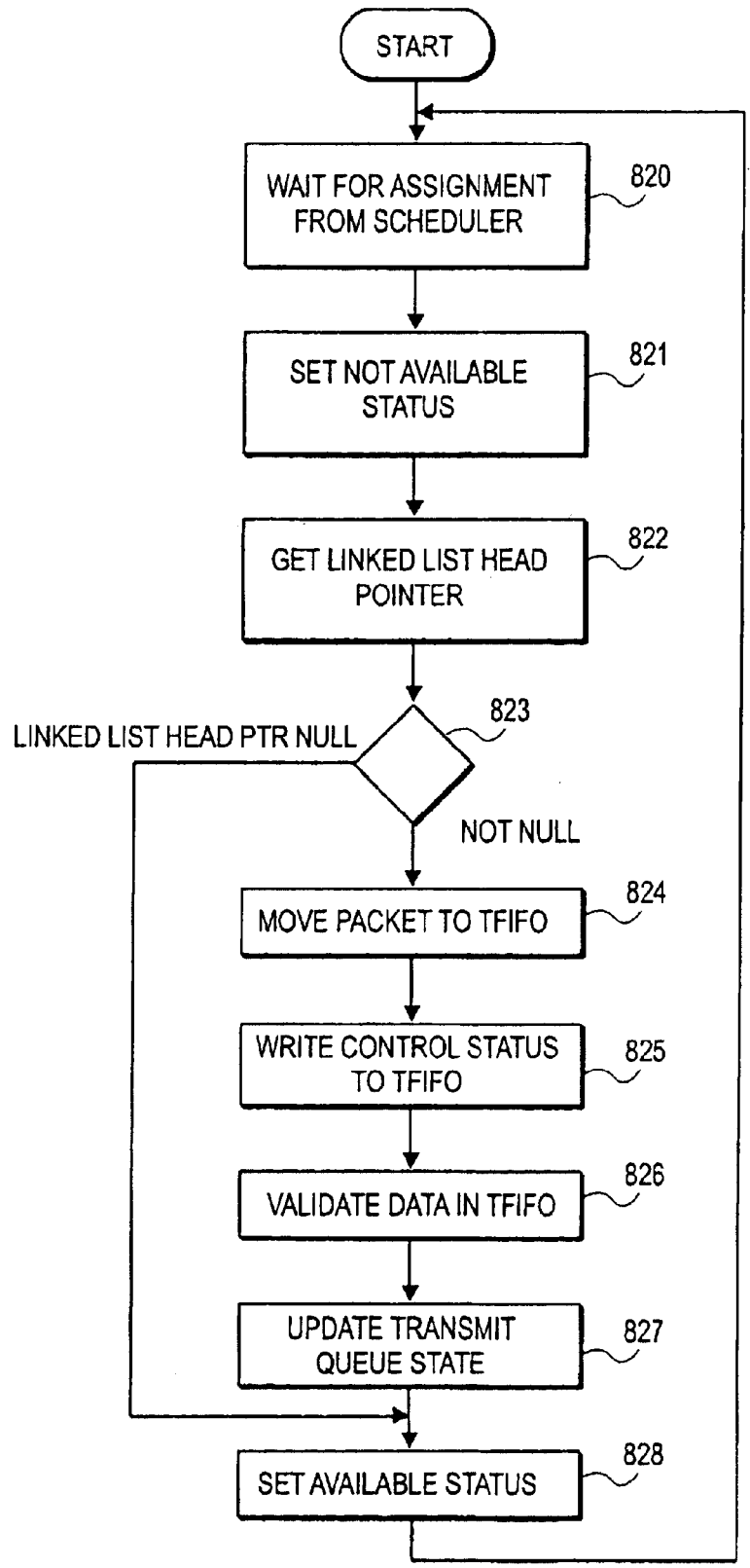

FIGS. 20A and 20B show flowcharts of the operation of a transmit thread. In one embodiment, a circular transmit queue is implemented. A circular transmit queue is fast but has a larger memory requirement. In another embodiment, a linked list is used to store the transmit queue. A linked list requires less memory, but is slower. A circular buffer is generally used when a high line rate such as a Gbit line rate is used, and a circular buffer is used when a slower line rate is used.

FIG. 20A illustrates how a transmit thread operates with a circular buffer transmit queue. The flowchart starts at box 801, at which the transmit thread waits for an assignment from a transmit scheduler. The transmit scheduler provides the assignment by writing to shared general purpose registers. At box 802, the transmit thread sets its status as not available. The transmit thread then looks up information on the assigned transmit queue including its state and memory location (box 803,804). The transmit thread moves packet data from memory to the TFIFO 134 (box 805), then writes control status to the TFIFO 134 (box 806). The transmit thread then writes a validate bit to indicate to the hardware that the packet data is ready to be sent out over the I/O bus (box 807). The transmit queue is updated (box 808), and the status is changed to available (box 809). The transmit thread returns to waiting for a new assignment from the scheduler (looping back to box 801).

Figure 21:
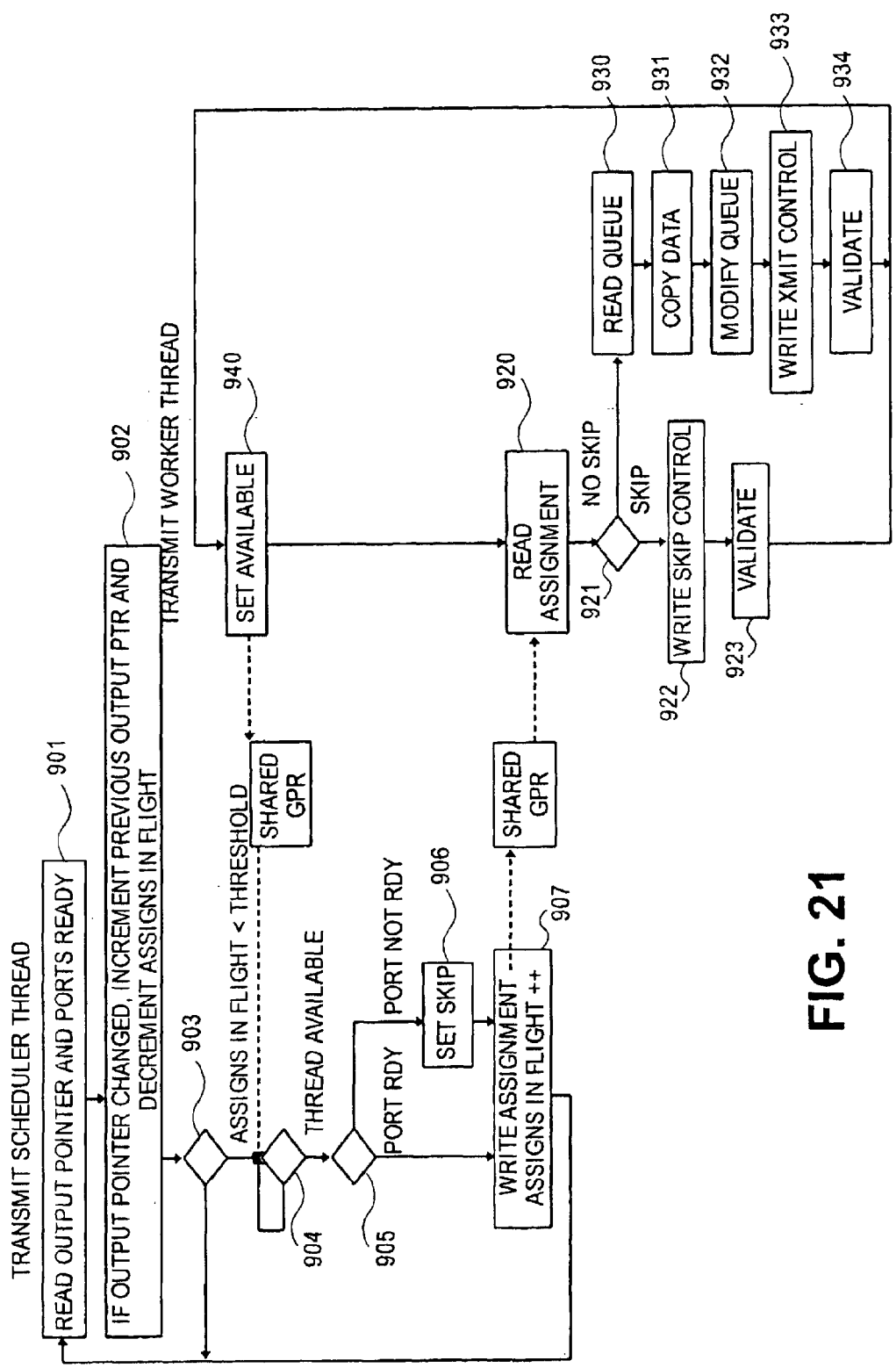
FIG. 21 shows one embodiment of the interactions between a transmit scheduler and a transmit thread.

FIG. 20B illustrates how a transmit thread operates with a linked list transmit queue. The flowchart is similar to FIG. 20A, however, at box 822, the transmit queue information is obtained based off of a head pointer of the linked list. If the linked list head pointer is null (box 823), then only the status is changed (back to available shown in box 828), and flow returns to the start with box 820. If the linked list head pointer is not null, then the transmit queue data is retrieved and the packet data is moved to the TFIFO (box 824). The transmit thread writes status to the TFIFO 134 (box 825). The data is validated (box 826) and the transmit queue is updated (box 827), and the transmit thread returns to waiting for a new assignment from the scheduler (looping back to box FIG. 21 shows one embodiment of the interactions between a transmit scheduler and a transmit thread. In this embodiment, each transmit scheduler rotates assignments in a round robin manner to three transmit threads, so its flow is repeated three times.

At box 901, the transmit scheduler reads a bus interface output pointer and a ports ready indicator. It compares the bus interface output pointer to the previous output pointer value at box 902. If there was a change, the transmit scheduler increments the previous output pointer value and decrements a counter called assigns in flight (box 903). In one embodiment, a threshold is predetermined to allow up to 14 assigns in flight. If equal or over this threshold, the transmit scheduler loops back to box 901 to reread the output pointer and the ports ready indicator. If less than the threshold, the transmit scheduler waits until a thread is available (box 904). The thread available indication is provided by a shared general purpose register (GPR) from the transmit thread to the transmit scheduler.

In one embodiment, ports are statically assigned to data elements based on their line rate. For example, sixteen 100 Mbit ports will map to sixteen elements. A 1 Gigabit port maps to 8 elements of TFIFO 134; a 1 Gigabit and 8 100 Mbit port configuration maps to 8 elements for the Gigabit port and 8 elements for the 8 100 Mbit ports. When the thread is available, a check is made to see if the port (associated with the next element) is ready (box 905). If not ready, a skip bit is set in the assignment (box 906). From box 905 and box 906, the assignment is written to a shared GPR for the transmit thread to pick up, and the counter assigns in flight is incremented (box 907). The transmit scheduler then loops back to box 901.

After indicating that it is available the transmit thread reads the assignment (box 920). The skip bit is checked (box 921). If the skip bit is set, the transmit thread writes a skip control word to the bus interface for the assigned element (box 922), and then send a validate for that element to the bus interface (box 923). If the skip bit is not set, the transmit thread gets information about the packet (box 930). For the first section of the packet, the information is obtained from a transmit queue that was written to by the receive side of the processor. This information is updated and saved in local GPRs (box 932). (For non-first packet sections, the information is obtained from a previously saved GPR or from memory.) Using the packet information, the transmit thread copies the data from DRAM to the assigned TFIFO (box 931). It then writes transmit control status (box 933) and sends a validate for that element to the bus interface (box 934). Finally, the transmit thread returns to indicate that it is available to the transmit scheduler (box 940).

Thus, a method of forwarding network data out of a processor includes using multiple schedulers to schedule multiple threads. However, the specific arrangements and methods described herein are merely illustrative of the principles of this invention. Numerous modifications in form and detail may be made without departing from the scope of the described invention. For example, although the previous description describes an embodiment of two schedulers making assignment to respective transmit threads, this concept can be extended to more than two schedulers and respective transmit threads. Although this invention has been shown in relation to a particular embodiment, it should not be considered so limited. Rather, the described invention is limited only by the scope of the appended claims.

What is claimed is:

1. A method of forwarding data out of a processor, the method comprising:

receiving data by the processor; and using two schedulers operating on different multi-threaded programmable engines integrated within the processor to assign processing threads to transmit data out of the processor, wherein a first of the two schedulers supports forwarding data out of a first set of ports and a second of the two schedulers supports forwarding data out of a second set of ports, wherein the first set of ports and the second set of ports are mutually exclusive and the processing threads may operate at least partially simultaneously; and wherein the first of the two schedulers assigns processing threads of the same programmable engine on which the first of the two schedulers is operating and the second of the two schedulers assigns processing threads of the same programmable engine on which the second of the two schedulers is operating.

2. The method of claim 1 further comprising:

moving first data elements from a memory to a transmit buffer by a first set of processing threads; and moving second data elements from the memory to the transmit buffer by a second set of processing threads; and alternatingly transferring first data elements and second data elements from the transmit buffer out the mutually-exclusive sets of ports.

3. The method of claim 2 further comprising:

bypassing transferring a data element out of the transmit buffer if a skip indication is received.

4. A method of forwarding packet data out of a processor, the method comprising:

using a first scheduler operating on a first of multiple multi-threaded programmable engines integrated within the processor to assign a processing thread to transmit a packet section out of the processor;

reading descriptor information containing information about the packet section, the descriptor information including a reference to a port;

transferring the packet section from memory to a transmit buffer in the processor;

transferring the packet section from the transmit buffer out the port; and signaling a second scheduler operating on a second of the multiple multi-threaded programmable engines integrated within the processor to assign a second processing thread to transmit a second packet section out of the processor, wherein the processing thread and the second processing thread operate simultaneously.

5. The method of claim 4 further comprising:

validating that the port is ready to accept a transfer of the packet section prior to transferring the packet section from the transmit buffer out the port.

6. The method of claim 5, wherein validating that the port is ready is performed by waiting for a ready indication from a media access controller (MAC).

7. The method of claim 6, further comprising:

setting a counter responsive to receiving the ready indication from the MAC; and altering the counter each time a data transfer to the port is performed.

8. The method of claim 7, further comprising:

checking the ready indication from the MAC after the counter has reached a predetermined threshold.

9. The method of claim 4, wherein the first scheduler handles all packet data going to a first set of ports, and the second scheduler handles all packet data going to a second set of ports, wherein the first set of ports is mutually exclusive of the second set of ports.

10. The method of claim 9, wherein the first set of ports is associated with a first line rate, and the second set of ports is associated with a second line rate, wherein the first line rate is faster than the second line rate.

11. The method of claim 10, wherein the first line rate is a Gigabit line rate.

12. A method of forwarding data out of a processor comprising alternatingly:

using a first scheduler operating on a first of multiple multi-threaded programmable engines integrated within the processor to assign a first set of processing threads to process packet data bound for a first set of ports; and using a second scheduler operating on a second of the multiple multi-threaded programmable engines integrated within the processor to assign a second set of processing threads to process packet data bound for a second set of ports that is mutually exclusive of the first set of ports.

13. The method of claim 12, further comprising:

verifying that an attached network device is ready to accept a transfer of a packet element from a transmit buffer; and waiting for the attached network device to become ready if the attached network device is not ready, and simultaneously continuing to verify that other attached network devices are ready to accept transfers of other packet elements from the transmit buffer.

14. The method of claim 13, further comprising:

setting a skip indication if there is no packet data waiting to be assigned to a processing thread; and bypassing transferring a data element from the transmit buffer out to a port in response to the skip indication.

15. The method of claim 14, further comprising:

alternatingly transferring first data elements processed by the first set of processing threads and second data elements processed by the second set of processing threads from the transmit buffer out of the processor.

16. The method of claim 15 further comprising:

interleaving execution between the first scheduler and the first set of processing threads on a common processor engine.

17. An article comprising a computer-readable medium which store computer-executable instructions for forwarding data to a plurality of ports, the instructions causing a computer to:

use a first scheduler to operate on first of multiple multi-threaded programmable engines integrated within the processor to assign a first set of processing threads to forward packet data bound for a first set of ports; and use a second scheduler to operate on second of multiple multi-threaded programmable engines integrated within the processor to assign a second set of processing threads to forward packet data bound for a second set of ports that is mutually exclusive of the first set of ports.

18. The article of claim 17, the article further comprises instructions to:
  program a first multi-purpose thread to be the first scheduler; and
  program a second multi-purpose thread to be the second scheduler.

19. An article comprising a computer-readable medium which store computer-executable instructions for causing, when executed, operations to:
  receive, at a first multi-threaded programmable engine of multiple multi-threaded programmable engines integrated within a processor, a signal from a second multi-threaded programmable engine of the multiple multi-threaded programmable cores; and
  in response to the receipt of the signal from the second multi-threaded programmable engine at the first multi-threaded programmable engine, assign one of the threads of the first multi-threaded programmable engine to transmit at least a portion of a data packet out of the processor;
  signal the second multi-threaded programmable engine from the first multi-threaded programmable engine; and in response to the signal from the first multi-threaded programmable engine at the second multi-threaded programmable engine, assign one of the threads of the second multi-threaded programmable engine to transmit at least a portion of a data packet out of the processor.

20. The article of claim 19, wherein the data packet comprises an Ethernet packet.

21. The article of claim 19, further comprising instructions to cause at least one thread of at least one of the multiple multi-threaded programmable engines to request transfer into the processor at least a portion of a data packet received at a media access controller coupled to the processor.

22. The article of claim 19, further comprising instructions of the one of the threads to transfer at least a portion of the assigned data packet to a first-in-first-out queue having a set of entries, wherein the first multi-threaded programmable engine writes data into a first assigned set of the entries and the second multi-threaded programmable engine writes data into a second assigned set of the entries.

* * * * *